(12) United States Patent
Haynes et al.

(10) Patent No.: US 9,587,350 B2
(45) Date of Patent: Mar. 7, 2017

(54) METHOD FOR REMOVING INK FROM PAPER

(75) Inventors: Robert Daniel Haynes, Tucker, GA (US); Scott Barton Auger, Woodstock, GA (US)

(73) Assignee: KEMIRA OYJ, Helsinki (FI)

( * ) Notice: Subject to any disclaimer, the term of this patent is extended or adjusted under 35 U.S.C. 154(b) by 0 days.

(21) Appl. No.: 13/578,680

(22) PCT Filed: Feb. 11, 2011

(86) PCT No.: PCT/US2011/024501
§ 371 (c)(1),
(2), (4) Date: Aug. 13, 2012

(87) PCT Pub. No.: WO2011/100530
PCT Pub. Date: Aug. 18, 2011

(65) Prior Publication Data
US 2012/0305206 A1    Dec. 6, 2012

Related U.S. Application Data

(60) Provisional application No. 61/303,828, filed on Feb. 12, 2010.

(30) Foreign Application Priority Data

Mar. 6, 2010 (EP) .................................... 10164835

(51) Int. Cl.
*D21C 5/02* (2006.01)
*D21C 5/00* (2006.01)

(52) U.S. Cl.
CPC ............. *D21C 5/027* (2013.01); *D21C 5/005* (2013.01); *D21C 5/025* (2013.01); *Y02W 30/648* (2015.05)

(58) Field of Classification Search
CPC ......... D21C 5/005; D21C 5/025; D21C 5/027
(Continued)

(56) References Cited

U.S. PATENT DOCUMENTS 5,503,709 A    4/1996    Burton
5,525,193 A    6/1996    Franks et al.
(Continued)

FOREIGN PATENT DOCUMENTS

EP    0 967 320 A1    12/1999
GB    2 231 595 A    11/1990
(Continued)

OTHER PUBLICATIONS

Morkbak et al.,Deinking of Mixed Office Paper; Old Newsprint and Vegetable Oil-Based Ink Printed Paper Using Cellulases, Xylanases, and Lipases, 1998, Progress in Paper Recycling, vol. 7 #2, p. 14-21.*

(Continued)

*Primary Examiner* — Anthony Calandra
(74) *Attorney, Agent, or Firm* — Berggren Inc.

(57) ABSTRACT

A method for removing ink from printed paper comprising: (a) pulping printed paper at least 25 wt % of which is old newsprint at a consistency of at least about 3% to obtain a pulp slurry; (b) treating the pulp slurry with an ink removing system, which system comprises: (i) a combination of lipase and at least one second enzyme chosen from amylase, xylanase or cellulase, and (ii) a non-ionic surfactant, in amounts effective to release ink from said pulp slurry, wherein the lipase is present in an amount of at least about 0.001 wt % based on the dry content of the pulp slurry and the ratio of the at least one second enzyme:lipase is at least about 1.2:1; and (c) separating the released ink from the pulp slurry, wherein the treating step is carried out prior to a deinking flotation stage.

20 Claims, 31 Drawing Sheets

(58) Field of Classification Search
USPC .................................................. 162/4, 5, 8
See application file for complete search history.

(56) References Cited

U.S. PATENT DOCUMENTS

| | | | |
|---|---|---|---|
| 5,582,681 A | 12/1996 | Back et al. | |
| 5,620,565 A | 4/1997 | Lazorisak et al. | |
| 5,705,476 A | 1/1998 | Hoffarth | |
| 5,780,283 A | 7/1998 | Lee | |
| 5,837,097 A | 11/1998 | Egawa et al. | |
| 5,856,163 A * | 1/1999 | Hashida et al. | 435/198 |
| 6,001,218 A | 12/1999 | Hsu et al. | |
| 6,027,610 A | 2/2000 | Back et al. | |
| 6,066,233 A | 5/2000 | Olsen et al. | |
| 6,074,527 A | 6/2000 | Hsu et al. | |
| 6,241,849 B1 | 6/2001 | Franks et al. | |
| 6,296,736 B1 | 10/2001 | Hsu et al. | |
| 6,387,210 B1 | 5/2002 | Hsu et al. | |
| 6,426,200 B1 | 7/2002 | Yang et al. | |
| 6,576,083 B2 | 6/2003 | Franks et al. | |
| 6,767,728 B2 | 7/2004 | Yang et al. | |
| 7,015,022 B2 | 3/2006 | Laskin et al. | |
| 7,169,257 B2 | 1/2007 | Rosencrance et al. | |
| 7,282,113 B2 | 10/2007 | Elgarhy et al. | |
| 7,504,120 B2 | 3/2009 | Steer et al. | |
| 2001/0047852 A1 | 12/2001 | Franks | |
| 2002/0142452 A1 | 10/2002 | Yang et al. | |
| 2002/0157798 A1 | 10/2002 | Franks et al. | |
| 2002/0179261 A1 | 12/2002 | Franks et al. | |
| 2004/0016522 A1 | 1/2004 | Franks et al. | |
| 2004/0099385 A1 | 5/2004 | Franks et al. | |
| 2005/0039869 A1 | 2/2005 | Franks et al. | |
| 2007/0158039 A1* | 7/2007 | Rosencrance et al. | 162/5 |
| 2008/0145355 A1* | 6/2008 | Porubcan | 424/94.21 |

FOREIGN PATENT DOCUMENTS

| | | |
|---|---|---|
| WO | WO 91/14822 A1 | 10/1991 |
| WO | WO 96/00811 A1 | 1/1996 |
| WO | WO 2007/018368 A1 | 2/2007 |

OTHER PUBLICATIONS

Soni et al., Novel Sources of Fungal Cellulases for Efficient Deinking of Composite Paper Waste, 2008, BioResources, 3(1), p. 234-246.*
NY Times, The Media Buisness; A new Ingredient for Many Papers;Soybean Ink, 1992, NY Times.*
Tappi, Introduction to centrifugal cleaners TIP 0508-10, 2007, TAPPI.*
European Search Report dated Oct. 15, 2010 for related Application No. EP 10 16 4835.
International Search Report and Written Opinion dated Apr. 6, 2011 for related International Application No. PCT/US2011/024501.
Abstract of Wang, Shoujan "Enzymatic deinking of old newspaper," Zhongguo Zaozh Xuebao, vol. 18 No. 2 (2003) pp. 86-89.
Abstract of GU, Qi-Ping "Enzymatic deinking of ONP with lipase/cellulase/xylanase," Chung kuo Tsao Chih, vol. 23, No. 2 (2004) pp. 7-9.
Ryu, Jeoug-Yong et al "Application of lipase to reduce ONP flotation rejects Part 1. Changes in hydrophobicity," Tappi Journal Jun. 2008 pp. 15-20.
Ryu, Jeoug-Yong et al "Application of lipase to reduce ONP flotation rejects Part 2. eduction of flotation rejects," Tappi Journal Aug. 2008 pp. 3-7.

* cited by examiner

METHOD FOR REMOVING INK FROM PAPER

This application is a national stage filing under 35 U.S.C. §371 of PCT/US2011/024501, filed Aug. 18, 2011, which claims priority to U.S. Provisional Patent Application No. 61/303,828, filed on Feb. 12, 2010, and European Patent Application No. 10164835.0, filed Mar. 6, 2010, the contents of which are incorporated herein by reference in their entirety.

FIELD OF THE INVENTION

The field of the invention relates to methods for deinking and decolorizing printed paper. More particularly, it relates to methods for removing ink from a paper pulp containing old newsprint.

BACKGROUND OF THE INVENTION

The paper industry has been practicing wastepaper recycling to regenerate usable cellulosic fiber for paper making for many decades. In these processes, ink is removed from the wastepaper pulp using a suitable deinking composition. The deinking process produces a new paper or paperboard product out of materials that might otherwise have ended up in a landfill.

Because of increasing public demand, the use of recycled paper has steadily increased. To recover the fibers used for papermaking from wastepaper, a waste paper deinking operation must generally be carried out to remove the inks used in printing, and thus create suitable characteristics for re-use. Increasing amounts of wastepaper, e.g. old newspapers (ONP) and waste magazines (WM), are becoming available with increased participation of end consumers in recycling.

In the course of conventional paper reclamation, deinking procedures include steps for converting the wastepaper to pulp and contacting the pulp with an alkaline aqueous deinking medium containing a chemical deinking agent. The mechanical action and the alkalinity of the aqueous medium cause the partial removal of ink from the pulp fiber. The deinking agent completes this removal and produces an aqueous suspension and/or dispersion of the ink particles. The resulting mixture is subsequently treated to separate the suspended/dispersed ink from the pulp. This separation may be by flotation and/or washing techniques known in the art.

Conventional deinking chemicals comprise a complex mixture of chemicals, e.g. sodium hydroxide, sodium silicate, chelating agents, hydrogen peroxide, surfactants, dispersants, collector chemicals and agglomeration chemicals. In general, it is standard in deinking to include a significant amount of alkaline material, since it is believed that the alkaline material is needed for sufficient saponification and hydrolysis of the ink resins. In addition, mention is made of the fiber swelling by the caustic being partially responsible for the detachment of ink particles from the fiber surface. Typically, the pH during such a deinking process is from about 9.5 to about 11. Exposing the cellulosic and lignocellulosic fibers to this degree of alkalinity tends to cause yellowing of the fibers and, therefore, it is generally necessary to add an oxidative or reductive bleaching agent, such as peroxide or sodium hydrosulfite. The reductive bleaching step is commonly employed at the end of the deinking process while hydrogen peroxide is added at the pulper. In some deinking operations hydrogen peroxide will be added later in the process.

Furthermore, the alkaline method causes irreversible changes to the pulp fibers, and hence represents a cost to the facility in addition to just the cost of using the chemical. Using caustic will also solubilize papermaking additives and coatings that will lead to additional runnability problems due to deposits at the paper machine.

Thus, there is a need for a deinking process that avoids these shortcomings, which is safe and which is economically and environmentally desirable.

It has been found by the present inventors that treatment of a wastepaper containing pulp with an ink removing system in accordance with the present invention fulfills the above-mentioned requirements to such a deinking process.

SUMMARY OF THE INVENTION

The present invention is directed to a method for removing ink from printed paper. In one embodiment, the invention relates to removing ink from a pulp containing old news print (ONP) and maintaining or increasing brightness of the deinked pulp in a neutral deinking process.

In a first aspect, the invention is directed to a method for removing ink from printed paper, which comprises: (a) pulping printed paper at least 25 wt % of which is old newsprint at a consistency of at least about 3% to obtain a pulp slurry; (b) treating the pulp slurry with an ink removing system, which system comprises: (i) a combination of lipase and at least one second enzyme chosen from amylase, xylanase or cellulase, and (ii) a non-ionic surfactant, in amounts effective to release ink from said pulp slurry, wherein the lipase is present in an amount of at least about 0.001 wt % based on the dry content of the pulp slurry and the ratio of the at least one second enzyme:lipase is at least about 1.2:1; and (c) separating the released ink from the pulp slurry in a deinking step (e.g., a deinking flotation stage) to provide a deinked pulp slurry, wherein the treating step is carried out prior to the deinking step.

In one embodiment of the invention, the enzyme combination is a combination of lipase and xylanase. The ratio of xylanase:lipase can be at least about 1.5:1. In embodiments of the invention, the ratio of xylanase:lipase can be chosen from a ratio in the range of about 1.5:1 to about 5:1; about 1.5:1 to about 4:1; about 1.5:1 to about 3:1; about 1.5:1 to about 2.5:1; about 2:1 to about 4:1; or about 2:1 to about 3:1. In additional embodiments the ratio of xylanase:lipase can be chosen from about 2:1, 2.5:1 or 3:1.

In an embodiment of the invention, the non-ionic surfactant can be chosen from fatty acid alkoxylates, fatty alcohol alkoxylates or mixtures thereof. The non-ionic surfactant can be chosen from fatty alcohol ethyoxylates (FAEO), propoxylates (FAPO) and combinations thereof (FAEPO).

In embodiments of the invention, the ratio of (i):(ii) present in the ink removing system can be chosen from a ratio in the range of about 1:1 to about 1:10; about 1:1 to about 1:5; or about 1:2 to about 1:4.

In another aspect of the invention, the above ink removing system can further comprise (iii) a soap. In another aspect, the ink removing system can further comprise (iv) an alkaline reagent. In yet another aspect, the ink removing system can further comprise (iii) a soap and (iv) an alkaline reagent.

In one embodiment, the consistency can be in the range of about 3 to about 30%. In additional embodiments, the consistency can be chosen from a value in the range of about 10% to about 17%, or about 18 to about 23%.

In an embodiment of the invention, the printed paper comprises at least about 40 wt % ONP. In another embodiment, the printed paper comprises at least about 50 wt % ONP. In other embodiments, the printed paper comprises ONP in an amount chosen from within the range of from about 40 to about 95 wt %, about 45 to about 90 wt %, or about 50 to about 80 wt %. In yet another embodiment of the invention, the printed paper further comprises old magazine print (OMG).

In one embodiment, where the ink removing system comprises (iii) a soap and (iv) an alkaline reagent, the combination of enzymes (i) can be a combination of lipase and xylanase. In such an embodiment, the ratio of xylanase:lipase can be as discussed above.

In one embodiment of the invention, the soap can be fatty acid soap. In another embodiment, the fatty acid soap can be derived from tallow. In yet another embodiment, the fatty acid soap can be derived from plant oils.

In one embodiment of the invention, the alkaline reagent is sodium silicate. In one embodiment, the combination of enzymes (i) is a combination of lipase and xylanase; the non-ionic surfactant (ii) is chosen from fatty alcohol ethoxylates (FAEO), propoxylates (FAPO) and combinations thereof (FAEPO); the soap (iii) is a tallow fatty acid soap; and the alkaline reagent (iv) is sodium silicate. In such an embodiment, the ratio of xylanase:lipase and the ratio of (i):(ii) can be as discussed above.

In one aspect of the invention, components (i) and (ii) are premixed to form an enzyme composition (v) and then adding (v) to the pulp slurry as a component of the ink removing system. In one embodiment, the enzyme composition (v) is added to the pulp slurry in an amount in the range of about 0.04 to about 0.5 wt %, the soap (iii) is added to the pulp slurry in an amount in the range of about 0.1 to about 1 wt %, and the alkaline reagent (iv) is added to the pulp slurry in an amount in the range of about 0.5 to about 2 wt %, all based on the solid content of the slurry.

In one embodiment of the invention, the pH of the slurry is maintained in the range of about 6 to about 11. The preferred range is 6.7 to 9.5, the more preferred range is 7 to 9 and the most preferred range is 7.5 to 8.8.

In one embodiment of the invention, the slurry is substantially free of sodium sulfite. In another embodiment the slurry is substantially free of sodium hydroxide or, if added to the slurry, the sodium hydroxide is added in an amount less than about 0.15 wt %, based on the weight of the slurry. In yet another embodiment, the slurry is substantially free of hydrogen peroxide. In yet another embodiment, two or all of these requirements (of being free of a specified material) are met.

Additional objects, advantages and novel features will be apparent to those skilled in the art upon examination of the description that follows.

BRIEF DESCRIPTIONS OF THE DRAWINGS

DETAILED DESCRIPTION OF THE INVENTION

Figure 1:
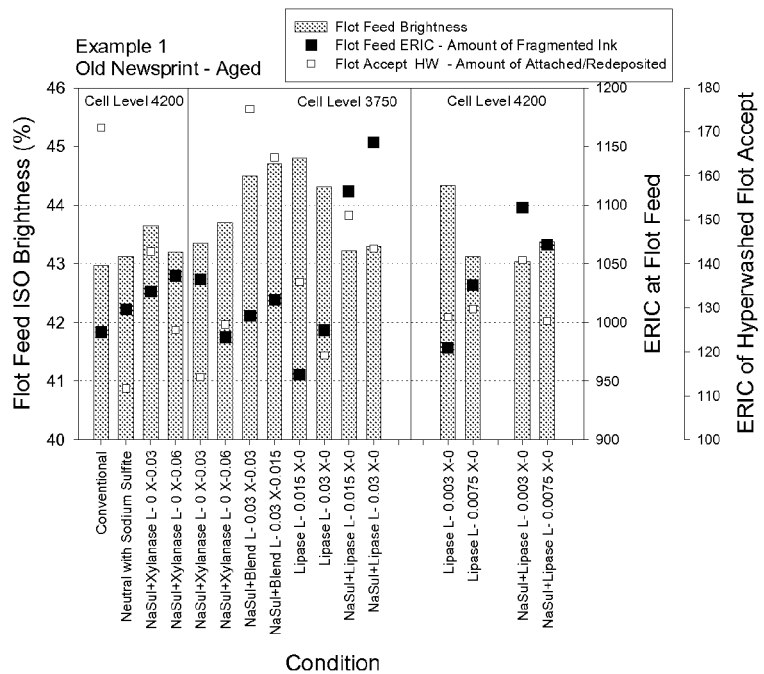
FIG. 1 is a graph showing the effect of enzymes and sodium sulfite on brightness (pulper) for Example 1 deinking systems.

The present invention is directed to a method for removing ink from printed paper. In one embodiment, the invention relates to removing ink from a pulp containing old news print (ONP) and maintaining or increasing brightness of the deinked pulp in a neutral deinking process.

In one aspect the invention is directed to an ink removing system, which system comprises: (i) a combination of lipase and at least one second enzyme chosen from amylase, xylanase or cellulase, and (ii) a non-ionic surfactant, in amounts effective to release ink from said pulp slurry, wherein the lipase is present in an amount of at least about 0.001 wt % based on the dry content of the pulp slurry and the ratio of the at least one second enzyme:lipase is at least about 1.2:1.

In one embodiment of the invention, the enzyme combination is a combination of lipase and xylanase. The ratio of xylanase:lipase can be at least about 1.5:1. In embodiments of the invention, the ratio of xylanase:lipase can be chosen from a ratio in the range of about 1.5:1 to about 5:1; about 1.5:1 to about 4:1; about 1.5:1 to about 3:1; about 1.5:1 to about 2.5:1; about 2:1 to about 4:1; or about 2:1 to about 3:1. In additional embodiments the ratio of xylanase:lipase can be chosen from about 2:1, 2.5:1 or 3:1.

In embodiments of the method for removing ink, the total amount of enzyme added to the pulp slurry in the ink removal system is less than 0.5 lbs (0.23 kg), or 0.45 lbs (0.2 kg), or 0.4 lbs (0.18 kg), or 0.3 lbs (0.14 kg) per ton (2000 lbs) of dry pulp.

In embodiments of the method for removing ink, the components of the ink removing system are present in an amount to achieve an ink removal efficiency of at least about 50%, or at least about 60%, or at least about 70%, or at least about 80% in the subsequent deinking flotation stage. Ink removal efficiency means the percentage of ink removed based on the original amount of ink contained in the printed paper pulp prior to treating with the ink removal system and subjecting it to a deinking step to provide a deinked pulp. For example, 50% ink removal efficiency means the deinked pulp has 50% less ink than the starting printed paper pulp. In embodiments of the invention, the pulp slurry after the deinking step (e.g., deinking flotation stage) has a substantially reduced amount of ink, including the printing ink resins or oils of the type typically contained in printing ink systems.

In embodiments of the invention, the deinked pulp contains less than 0.2 wt % or is substantially free of vegetable oils and mineral oils found in printing inks. In an embodiment of the method for removing ink, no vegetable or mineral oil is added to the pulp slurry.

Examples of nonionic surfactants include a higher aliphatic alcohol alkoxylate, aliphatic acid alkoxylate, higher aromatic alcohol alkoxylate, fatty acid amide of alkanolamine, fatty acid amide alkoxylate, propylene glycol alkoxylate, block or random copolymer of ethylene and propylene oxide, or higher alcohol polyethylene polypropylene block or random adducts.

In an embodiment of the invention, the non-ionic surfactant can be chosen from fatty acid alkoxylates, fatty alcohol alkoxylates or mixtures thereof. The non-ionic surfactant can be chosen from fatty alcohol ethyoxylates (FAEO), propoxylates (FAPO) and combinations thereof (FAEPO). In an embodiment of the invention, the non-ionic surfactant is chosen or incorporated in a system to provide a low foaming deinking system. The non-ionic surfactant itself, or composition containing the surfactant, can be low foaming. Examples of commercially available surfactant products that are useful in the present invention include Eka RF 4000 and 4200 series deinking products available from Eka Chemicals, and in particular Eka RF 4031 and Eka RF 4291. In one embodiment, the Eka RF 4291 deinking product is preferred to be included.

In one aspect of the invention, the ink removing system can further comprise (iii) a soap. In another aspect, the ink removing system can further comprise (iv) an alkaline reagent. In yet another aspect, the ink removing system can further comprise (iii) a soap and (iv) an alkaline reagent.

The soap can be fatty acid soap. The fatty acid soap can be derived from tallow or can be derived from plant oils.

In one embodiment of the invention, the alkaline reagent is sodium silicate.

EXAMPLES

The following examples were conducted to evaluate the performance of deinking systems in a neutral deinking process:

1. Flot studies using a ratio of 70% old newsprint (ONP) and 30% Old Magazine (OMG) were conducted using a mixture of the Wall Street Journal and the Los Angles Times. The example represents an average of tests that have similar amounts of rejects and hyperwash ERIC values. The test conditions were selected based on the assumption that the character of the ink changes with age so having similar hyperwash ERIC values means that the results are for paper with comparable aging effects.
2. Flot studies using just the Wall Street Journal were conducted based on preliminary tests showing that the different newspapers were impacting the amount of rejects.
3. Flot studies using just the Globe and Mail from Canada were conducted.
4. The results for a mill scale trial conducted in Canada.

Typical equipment, furnish and conditions used for examples 1-15 were as follows:

Equipment and Furnish

TABLE 1

Pulper Components used in Examples.

| | |
|---|---|
| Pulper | Kitchen Aid Mixer |
| Flot Cell | Stainless Steel FRED Cell (Flotation with Radial Ejection Deinking Cell) |
| Furnish Mix ONP/OMG | 70/30 |
| Amount Old Newsprint | 50 g air weight dry |
| Wall Street Journal (WSJ) | 17.5 g |
| LA Times (LAT) | 17.5 g |
| Old Magazine | |
| People | 5 g |
| Shape | 5 g |
| Bazaar | 5 g |
| Old Newsprint Canada | |
| Globe & Mail | 32 g |

Conditions:

TABLE 2

Pulping Conditions for Examples.

| | |
|---|---|
| Pulping Time | 10 min |
| Pulping Temperature | 45° C. (Water baths were run 5° C. higher) |
| Pulping % Consistency Kitchen Aid | 12% |
| Pre-pulping soak | 0 min |
| Pulping Hardness | Use tap water |
| Hold Time after pulping | 10 min |
| Flotation Time | 5-8 min |

TABLE 2-continued

Pulping Conditions for Examples.

| | |
|---|---|
| Flotation % Consistency | 1% |
| Weight of Stock Added | 3750-4200 g |
| Hardness (added at flot) | 9 ml of 10% $CaCl_2$ If flot feed hardness is not at desired level after addition of the 9 ml - additional CaCl2 added until desired ppm |
| Target hardness around 180 ppm | |
| Samples | Pulper, Flot Accepts, Hyperwash Flot Accept |
| Rejects | Volume, Weight, Ash |
| Pump Speed | 60 |
| Air | 15-20 SCHF |

Pulper Chemistry and Deinking Dosage:

TABLE 3

Pulper and deinking chemistry for Examples.

| | | % on Fiber |
|---|---|---|
| Conventional Chemistry: | | |
| Deinking Agents | NaOH (10%) | 1% |
| | Na Silicate (NaSil) | 1.5% |
| | H2O2 | 1% |
| | Eka RF 4031 | 0.5% |
| | Eka RF 4291 | 0.06% |
| Neutral Chemistry | | |
| Deinking Agents | Sodium Sulfite (NaSul) | 1.5% |
| | NaSil | 1.5% |
| | Eka RF 4031 | 0.5% |
| | Eka RF 4291 | 0.06% |
| Neutral Chemistry + Enzymes with No Sulfite | | |
| Deinking Agents | NaSil | 1.5% |
| | Eka RF 4031 | 0.5% |
| | Eka RF 4291 | 0.06% |
| Enzymes | Eka RF 4031-E6634: 95.7% RF 4031, 2.9% Xylanase, 1.4% Lipase | 0.5225% |
| | Eka RF 4291-E6634: 72.7% RF 4291, 18.2% Xylanase, 9.1% Lipase (treated as 100% active) | 0.0825% |
| | Xylanase | Varied |
| | Lipase | Varied |
| | E6634: 66% xylanase, 34% lipase | Varied |
| | E5050: 50% xylanase, 50% lipase | Varied |

In each of the Examples, the tests were run in random order to prevent run order errors, but are listed in the tables out of sequence to group the tests according to the conditions used, e.g., cell level and enzymes used, to make analysis easier. In some Examples, test numbers have been omitted from the tables where duplicate tests were run or where a unique chemistry was used, e.g., another component was added, that makes the tests not relevant or not comparable to the present invention. In the case of duplicate tests, the results listed in the tables are an average of the results for the duplicate tests.

Regarding pulp liquor pH, while it is not always possible or easy to measure the pH of the combined pulping chemicals and dilution water in a particular mill setting in real time, it can be measured in a lab setting. Accordingly, in the following examples the measured pH of the combined chemicals and the dilution water is referred to as the "Pulp Liquor pH", which is helpful in seeing how changes in alkaline reagents addition impact of pH.

Example 1

The pulping recipes used in Example 1 (Tests 1-16) are listed below in Table 4. The specific pulping components and conditions were: 17.5 grams each of WSJ and LAT, flotation time of 8 min, and air rate of 20 SCHF. The pH operating ranges used for Example 1 are listed below in Table 5.

TABLE 4

Pulping recipes for tests 1-16 (Example 1).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 1 | 4200 | Conventional | Eka RF 4291 + Eka RF 4031 | | | | NA | 10.9 | 8.8 |
| 2 | 4200 | Sodium Sulfite | Eka RF 4291 + Eka RF 4031 | Yes | | | NA | 9.4 | 7.5 |
| 5 | 4200 | NaSul + Xylanase | Eka RF 4291 + Eka RF 4031 | Yes | 0.03 | 0 | NA | | 7.5 |
| 4 | 4200 | NaSul + Xylanase | Eka RF 4291 + Eka RF 4031 | Yes | 0.06 | 0 | NA | 9.5 | 7.4 |
| 6 | 3750 | NaSul + Xylanase | Eka RF 4291 + Eka RF 4031 | Yes | 0.03 | 0 | NA | 9.6 | 7.5 |
| 3 | 3750 | NaSul + Xylanase | Eka RF 4291 + Eka RF 4031 | Yes | 0.06 | 0 | NA | 9.4 | 7.4 |
| 7 | 3750 | NaSul + Blend | Eka RF 4291 + Eka RF 4031 | Yes | 0.03 | 0.03 | 50/50 | 9.6 | 7.5 |
| 8 | 3750 | NaSul + Blend | Eka RF 4291 + Eka RF 4031 | Yes | 0.015 | 0.03 | 34/66 | 9.6 | 7.4 |
| 10 | 3750 | Lipase | Eka RF 4291 + Eka RF 4031 | No | 0 | 0.015 | NA | 9.4 | 7.4 |
| 9 | 3750 | Lipase | Eka RF 4291 + Eka RF 4031 | No | 0 | 0.03 | NA | 9.4 | 7.5 |
| 14 | 3750 | NaSul + Lipase | Eka RF 4291 + Eka RF 4031 | Yes | 0 | 0.015 | NA | 9.6 | 7.4 |
| 13 | 3750 | NaSul + Lipase | Eka RF 4291 + Eka RF 4031 | Yes | 0 | 0.03 | NA | 9.6 | 7.5 |
| 12 | 4200 | Lipase | Eka RF 4291 + Eka RF 4031 | No | 0 | 0.003 | NA | 9.4 | 7.3 |
| 11 | 4200 | Lipase | Eka RF 4291 + Eka RF 4031 | No | 0 | 0.0075 | NA | 9.5 | 7.5 |
| 16 | 4200 | NaSul + Lipase | Eka RF 4291 + Eka RF 4031 | Yes | 0 | 0.003 | NA | 9.6 | 7.6 |
| 15 | 4200 | NaSul + Lipase | Eka RF 4291 + Eka RF 4031 | Yes | 0 | 0.0075 | NA | 9.6 | 7.6 |

TABLE 5 pH ranges for Example 1 for neutral deinking.

| | Pulping Liquor | Pulping Flot Feed |
|---|---|---|
| Max pH | 9.6 | 7.6 |
| Min pH | 9.4 | 7.3 |

The deinking performance of the various test recipes were evaluated and the results are shown below in Table 6.

TABLE 6

Deinking Results for tests 1-16 (Example 1).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs. Sulfite | Removal Efficiency at Flot |
|---|---|---|---|---|---|---|---|---|---|---|
| 1 | 297 | 992 | 261 | 171 | 42.98 | 54.72 | 57.34 | | −1.5 | 74 |
| 2 | 283 | 1011 | 254 | 112 | 43.13 | 56.25 | 57.76 | 1.5 | | 75 |
| 5 | 35 | 1026 | 221 | 143 | 43.65 | 57.00 | 56.26 | 2.3 | 0.7 | 78 |
| 4 | 452 | 1040 | 224 | 125 | 43.20 | 56.82 | 57.23 | 2.1 | 0.6 | 78 |
| 6 | 92 | 1037 | 287 | 114 | 43.35 | 55.44 | 57.08 | 0.7 | −0.8 | 72 |
| 3 | 87 | 988 | 233 | 126 | 43.70 | 56.92 | 56.38 | 2.2 | 0.7 | 76 |
| 7 | 325 | 1006 | 155 | 175 | 44.50 | 59.20 | 56.55 | 4.5 | 2.9 | 85 |
| 8 | 341 | 1020 | 154 | 164 | 44.70 | 59.10 | 56.94 | 4.4 | 2.8 | 85 |
| 10 | 147 | 955 | 210 | 136 | 44.81 | 56.91 | 56.56 | 2.2 | 0.7 | 78 |
| 9 | 192 | 993 | 198 | 119 | 44.31 | 57.31 | 56.36 | 2.6 | 1.1 | 80 |
| 14 | 217 | 1112 | 221 | 151 | 43.22 | 56.89 | 56.75 | 2.2 | 0.6 | 80 |

TABLE 6-continued

Deinking Results for tests 1-16 (Example 1).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs. Sulfite | Removal Efficiency at Flot |
|---|---|---|---|---|---|---|---|---|---|---|
| 13 | 447 | 1154 | 161 | 143 | 43.29 | 58.99 | 56.69 | 4.3 | 2.7 | 86 |
| 12 | 474 | 979 | 233 | 128 | 44.33 | 56.49 | 56.52 | 1.8 | 0.2 | 76 |
| 11 | 541 | 1032 | 222 | 130 | 43.13 | 56.55 | 56.38 | 1.8 | 0.3 | 78 |
| 16 | 593 | 1098 | 191 | 141 | 43.04 | 57.59 | 56.50 | 2.9 | 1.3 | 83 |
| 15 | 632 | 1066 | 183 | 127 | 43.38 | 57.66 | 56.89 | 2.9 | 1.4 | 83 |

In addition to the results in Table 6, the following was observed: tests 3, 5 and 6 had less foam with less rejects generated; tests 7 and 8 (with enzyme blends) gave the best ink removal; tests 11, 12, 15 and 16 had too much wet rejects; and test 13 showed good ink removal but too much rejects. For this Example a reject amount over about 350 g was considered too high a yield loss.

Figure 2:
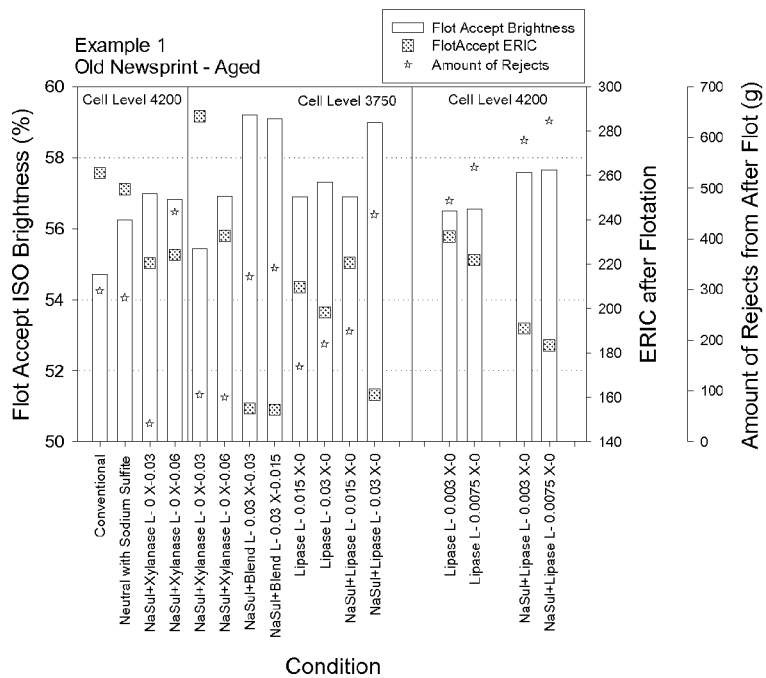
FIG. 2 is a graph showing the effect of enzymes and sodium sulfite on brightness (Flot and Hyper) for Example 1 deinking systems.
Figure 3:
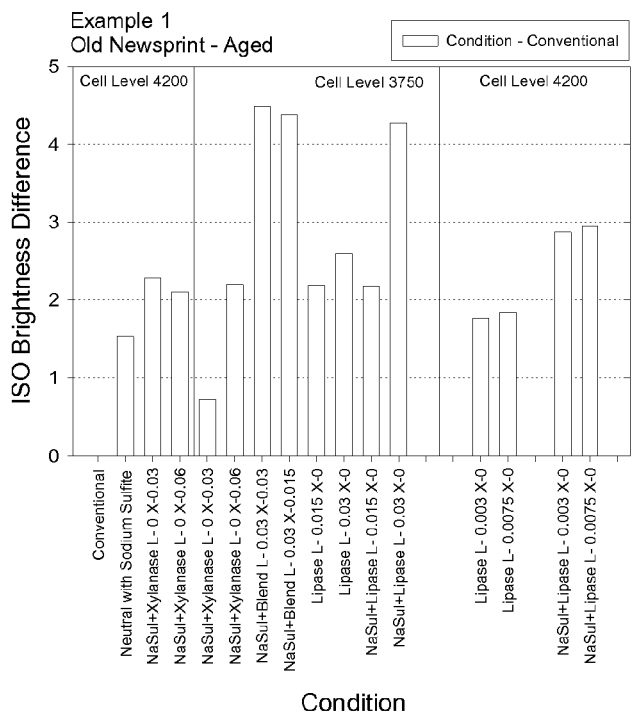
FIG. 3 is a graph showing the effect of enzymes and sodium sulfite on brightness difference (vs. conventional) for Example 1 deinking systems.
Figure 4:
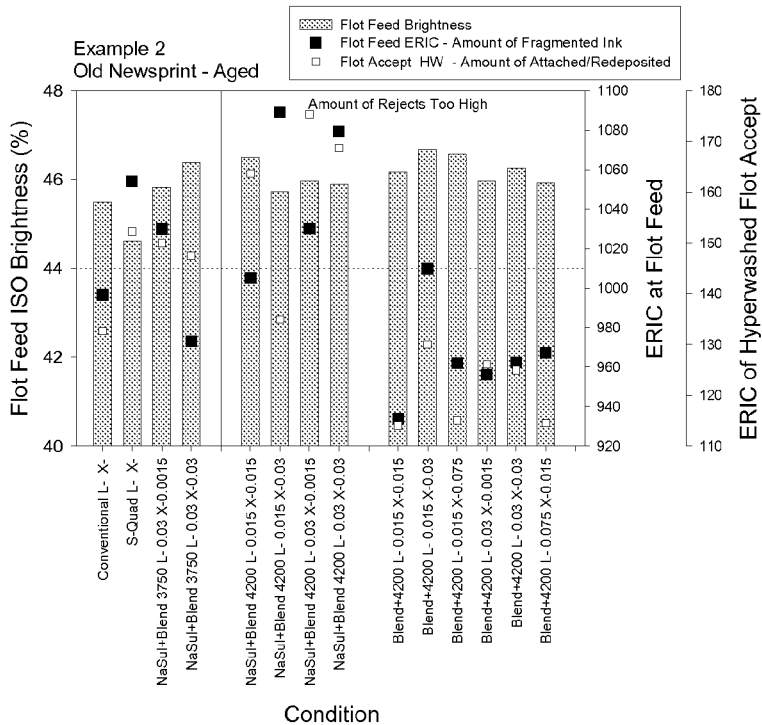
FIG. 4 is a graph showing the effect of enzymes and sodium sulfite on brightness (pulper) for Example 2 deinking systems.
Figure 5:
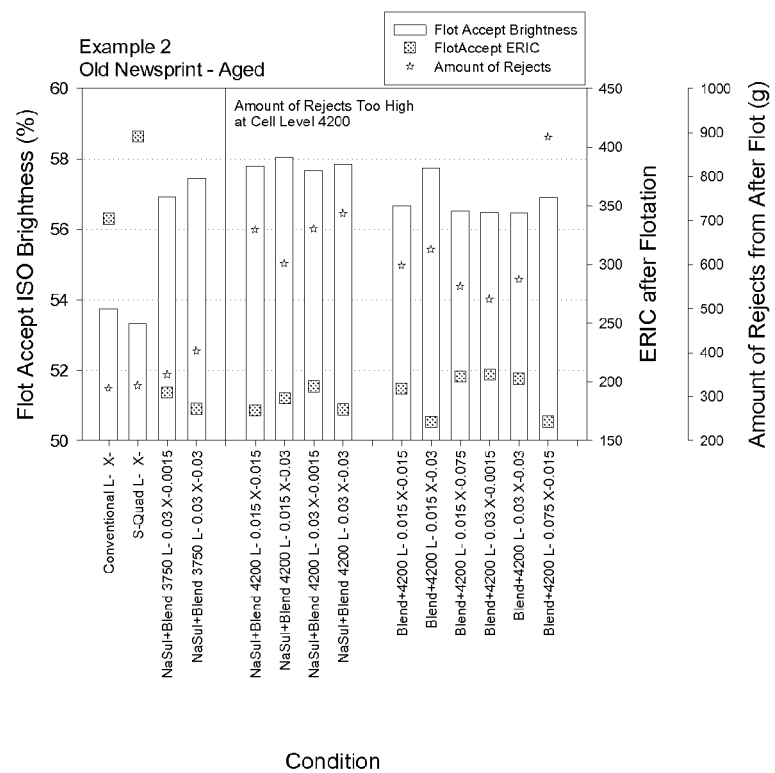
FIG. 5 is a graph showing the effect of enzymes and sodium sulfite on brightness (Flot and Hyper) for Example 2 deinking systems.
Figure 6:
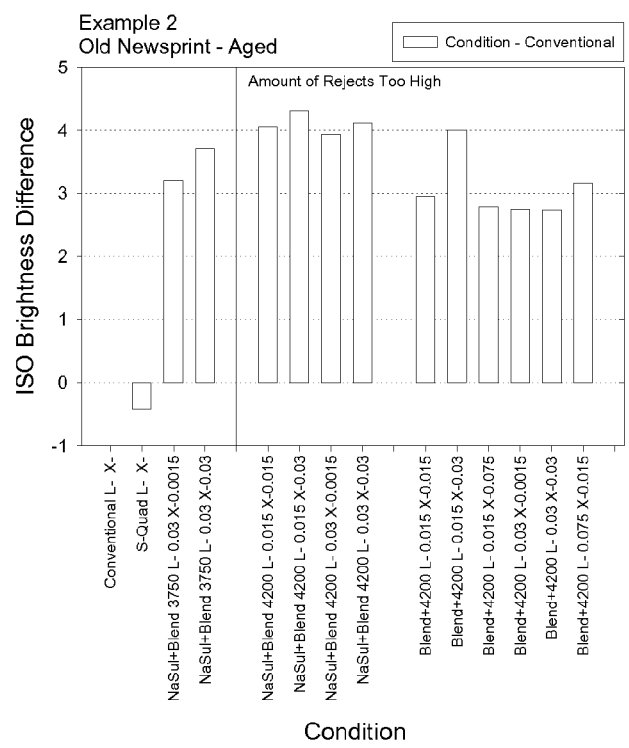
FIG. 6 is a graph showing the effect of enzymes and sodium sulfite on brightness difference (vs. conventional) for Example 2 deinking systems.

The results of the deinking tests for Example 1 are shown graphically in FIGS. 1-3. A review of these figures shows that blending the lipase and xylanase at ratios of 50/50 or 66/34 gave the best deinking performance with a reasonable level of rejects. Lipase and xylanase added with a recipe that included sodium sulfite also performed better than conventional or sulfite based neutral deinking.

Example 2

The pulping recipes used in Example 2 (Tests 1-16) are listed below in Table 7. The specific pulping components and conditions were: 17.5 grams each of WSJ and LAT, flotation time of 8 min, and air rate of 20 SCHF. The pH operating ranges for Example 2 are listed below in Table 7.

TABLE 7

Pulping recipes for tests 1-16 (Example 2).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 1 | 4200 | Conventional | Eka RF4291, Eka RF4031 | No | 0 | 0 | NA | 11.25 | 8.95 |
| 2 | 4200 | Sodium Sulfite | Eka RF4291, Eka RF 4031 | Yes | 0 | 0 | NA | 9.56 | 7.71 |
| 4 | 3750 | NaSul + Blend | Eka RF4291, Eka RF4031 | Yes | 0.0015 | 0.03 | 5/95 | 9.60 | 7.56 |
| 3 | 3750 | NaSul + Blend | Eka RF4291, Eka RF4031 | Yes | 0.03 | 0.03 | 50/50 | 9.61 | 7.55 |
| 7 | 4200 | NaSul + Blend | Eka RF4291, Eka RF4031 | Yes | 0.015 | 0.015 | 50/50 | 9.60 | 7.62 |
| 8 | 4200 | NaSul + Blend | Eka RF4291, Eka RF4031 | Yes | 0.03 | 0.015 | 66/34 | 9.63 | 7.57 |
| 6 | 4200 | NaSul + Blend | Eka RF4291, Eka RF4031 | Yes | 0.0015 | 0.03 | 5/95 | 9.60 | 7.55 |
| 5 | 4200 | NaSul + Blend | Eka RF4291, Eka RF4031 | Yes | 0.03 | 0.03 | 50/50 | 9.57 | 7.53 |
| 13 | 4200 | Blend | Eka RF4291, Eka RF4031 | No | 0.015 | 0.015 | 50/50 | 9.51 | 7.26 |
| 14 | 4200 | Blend | Eka RF4291, Eka RF4031 | No | 0.03 | 0.015 | 66/34 | 9.48 | 7.25 |
| 16 | 4200 | Blend | Eka RF4291, Eka RF4031 | No | 0.075 | 0.015 | 80/20 | 9.47 | 7.38 |
| 12 | 4200 | Blend | Eka RF4291, Eka RF4031 | No | 0.0015 | 0.03 | 5/95 | 9.45 | 7.44 |
| 11 | 4200 | Blend | Eka RF4291, Eka RF4031 | No | 0.003 | 0.03 | 50/50 | 9.44 | 7.52 |
| 15 | 4200 | Blend | Eka RF4291, Eka RF4031 | No | 0.015 | 0.075 | 20/80 | 9.34 | 7.43 |

TABLE 8 pH ranges for Example 2 for neutral deinking.

|  | Pulping Liquor | Pulping Flot Feed |
|---|---|---|
| Max pH | 9.6 | 7.7 |
| Min pH | 9.3 | 7.3 |

The deinking performance of the various test recipes were evaluated and the results are shown below in Table 9.

TABLE 9

Deinking Results for tests 1-16 (Example 2).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs. Sulfite | Removal Efficiency at Flot |
|---|---|---|---|---|---|---|---|---|---|---|
| 1 | 318 | 997 | 339 | 133 | 45.5 | 53.7 | 56.8 | NA | 0.42 | 66.0 |
| 2 | 325 | 1054 | 409 | 152 | 44.6 | 53.3 | 53.8 | −0.42 | NA | 61.2 |
| 4 | 349 | 1030 | 191 | 150 | 45.8 | 56.9 | 54.9 | 3.20 | 3.61 | 81.5 |
| 3 | 404 | 973 | 177 | 147 | 46.4 | 57.4 | 54.4 | 3.71 | 4.13 | 81.8 |
| 7 | 679 | 1005 | 176 | 164 | 46.5 | 57.8 | 52.9 | 4.06 | 4.47 | 82.5 |
| 8 | 602 | 1089 | 186 | 135 | 45.7 | 58.0 | 53.7 | 4.31 | 4.73 | 82.9 |
| 6 | 680 | 1030 | 196 | 175 | 46.0 | 57.7 | 54.3 | 3.94 | 4.35 | 81.0 |
| 5 | 715 | 1079 | 177 | 169 | 45.9 | 57.9 | 52.7 | 4.12 | 4.53 | 83.6 |
| 13 | 598 | 934 | 194 | 114 | 46.2 | 56.7 | 52.1 | 2.95 | 3.36 | 79.2 |
| 14 | 634 | 1010 | 166 | 130 | 46.7 | 57.7 | 53.5 | 4.01 | 4.42 | 83.6 |
| 16 | 550 | 962 | 204 | 115 | 46.6 | 56.5 | 53.6 | 2.79 | 3.20 | 78.8 |
| 12 | 521 | 956 | 206 | 126 | 46.0 | 56.5 | 54.9 | 2.75 | 3.16 | 78.5 |
| 11 | 566 | 962 | 203 | 125 | 46.3 | 56.5 | 53.8 | 2.74 | 3.15 | 78.9 |
| 15 | 890 | 967 | 166 | 115 | 45.9 | 56.9 | 52.0 | 3.16 | 3.57 | 82.8 |

In addition to the results in Table 9, the following was observed: tests 5-8 and 11-16 had too much rejects. For this Example a reject amount over about 400 g was considered too high a yield loss.

The results of the deinking tests for Example 2 are shown graphically in FIG. 3-6. A review of these figures shows that a blend of lipase and xylanase at either a ratio of 95/5 or 50/50 and a cell level of 3750 g performed better than conventional or sulfite based neutral deinking. Much of the study was conducted at a level of 4200 g which rejected too much material. Removing sodium sulfite but keeping the enzymes reduced reject volume and improved ink detachment. Dosages of lipase of 0.15% and 0.03% gave about the same level of rejects.

Example 3

The pulping recipes used in Example 3 (Tests 1-17) are listed below in Table 10. The specific pulping components and conditions were: 17.5 grams each of WSJ and LAT, flotation time of 8 min, and air rate of 20 SCHF. The pH operating ranges for Example 3 are listed below in Table 11.

TABLE 10

Pulping recipes for tests 1-17 (Example 3).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 1 | 4200 | Conventional | Eka RF4291, Eka RF4031 |  |  |  |  | 11.22 | 9.17 |
| 2 | 4200 | Sodium Sulfite | Eka RF4291, Eka RF 4031 | Yes |  |  |  | 9.58 | 7.79 |
| 4 | 3750 | NaSul + Blend | Eka RF4291, Eka RF4031 | Yes | 0.015 | 0.015 | 50/50 | 9.61 | 7.76 |
| 3 | 3750 | NaSul + Blend | Eka RF4291, Eka RF4031 | Yes | 0.015 | 0.03 | 34/66 | 9.61 | 7.80 |
| 17 | 4200 | Blend | Eka RF4291, Eka RF4031 |  | 0.015 | 0.0075 | 66/34 | 9.43 | 7.45 |
| 15 | 4200 | NaSul + Blend | Eka RF4291, Eka RF4031 | Yes | 0.0075 | 0.0075 | 50/50 | 9.44 | 6.84 |
| 10 | 4200 | NaSul + Blend | Eka RF4291, Eka RF4031 | Yes | 0.015 | 0.015 | 50/50 | 9.60 | 7.50 |
| 11 | 4200 | NaSul + Blend | Eka RF4291, Eka RF4031 | Yes | 0.03 | 0.03 | 50/50 | 9.58 | 7.51 |
| 16 | 4200 | Blend | Eka RF4291, Eka RF4031 |  | 0.0075 | 0.0075 | 50/50 | 9.58 | 7.63 |
| 14 | 4200 | Blend | Eka RF4291, Eka RF4031 |  | 0.015 | 0.0075 | 66/34 | 9.42 | 7.00 |

TABLE 10-continued

Pulping recipes for tests 1-17 (Example 3).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 13 | 4200 | Blend | Eka RF4291, Eka RF4031 | | 0.0075 | 0.015 | 34/66 | 9.38 | 7.20 |
| 12 | 4200 | Blend | Eka RF4291, Eka RF4031 | | 0.015 | 0.015 | 50/50 | 9.41 | 6.98 |
| 5 | 4200 | NaSul w H2O2 | Eka RF4291, Eka RF4031 | Yes | | | | 9.48 | 7.74 |
| 6 | 4200 | NaSul w H2O2 | Eka RF4291, Eka RF4031 | Yes | | | | 9.50 | 7.68 |
| 7 | 4200 | H2O2 | Eka RF4291, Eka RF4031 | | | | | 9.23 | 7.10 |
| 8 | 4200 | H2O2 | Eka RF4291, Eka RF 4031 | | | | | 9.29 | 6.94 |

TABLE 11 pH ranges for Example 3 for neutral deinking.

| | Pulping Liquor | Pulping Flot Feed |
|---|---|---|
| Max pH | 9.6 | 7.8 |
| Min pH | 9.2 | 6.8 |

The deinking performance of the various test recipes were evaluated and the results are shown below in Table 12.

TABLE 12

Deinking Results for tests 1-17 (Example 3).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs. Sulfite | Removal Efficiency at Flot |
|---|---|---|---|---|---|---|---|---|---|---|
| 1 | 470 | 1057 | 298 | 113 | 43.4 | 54.0 | 57.3 | | −2.6 | 71.9 |
| 2 | 542 | 1155 | 244 | 132 | 43.5 | 56.6 | 57.3 | 2.6 | | 78.9 |
| 4 | 499 | 1097 | 168 | 128 | 44.4 | 59.0 | 56.6 | 5.0 | 2.4 | 84.7 |
| 3 | 566 | 1136 | 161 | 121 | 43.0 | 57.6 | 54.2 | 3.6 | 1.0 | 85.8 |
| 17 | 603 | 1048 | 217 | 125 | 45.0 | 57.7 | 57.2 | 3.7 | 1.1 | 79.3 |
| 15 | 639 | 1139 | 221 | 110 | 43.6 | 57.1 | 56.9 | 3.1 | 0.5 | 80.6 |
| 10 | 850 | 1164 | 186 | 113 | 44.1 | 59.0 | 58.2 | 5.0 | 2.4 | 84.0 |
| 11 | 841 | 1120 | 172 | 121 | 44.0 | 59.3 | 57.9 | 5.3 | 2.6 | 84.6 |
| 16 | 786 | 1089 | 193 | 125 | 44.7 | 58.4 | 57.6 | 4.4 | 1.8 | 82.3 |
| 14 | 618 | 1111 | 218 | 115 | 43.8 | 57.4 | 57.8 | 3.3 | 0.7 | 80.4 |
| 13 | 621 | 1091 | 209 | 115 | 44.0 | 57.3 | 57.8 | 3.3 | 0.7 | 80.8 |
| 12 | 755 | 1094 | 191 | 112 | 44.0 | 58.1 | 56.8 | 4.1 | 1.5 | 82.5 |
| 5 | 656 | 1175 | 223 | 110 | 42.7 | 57.5 | 56.4 | 3.5 | 0.9 | 81.0 |
| 6 | 618 | 1156 | 209 | 153 | 43.3 | 57.7 | 55.2 | 3.6 | 1.0 | 81.9 |
| 7 | 574 | 1140 | 319 | 122 | 42.7 | 54.6 | 56.9 | 0.6 | −2.0 | 72.1 |
| 8 | 454 | 1115 | 322 | 115 | 44.6 | 55.5 | 57.1 | 1.4 | −1.2 | 71.1 |

In addition to the results in Table 12, the following was observed: tests 6 and 10-16 had too much rejects. For this Example a reject amount over about 570-600 g was considered too high a yield loss.

Figure 7:
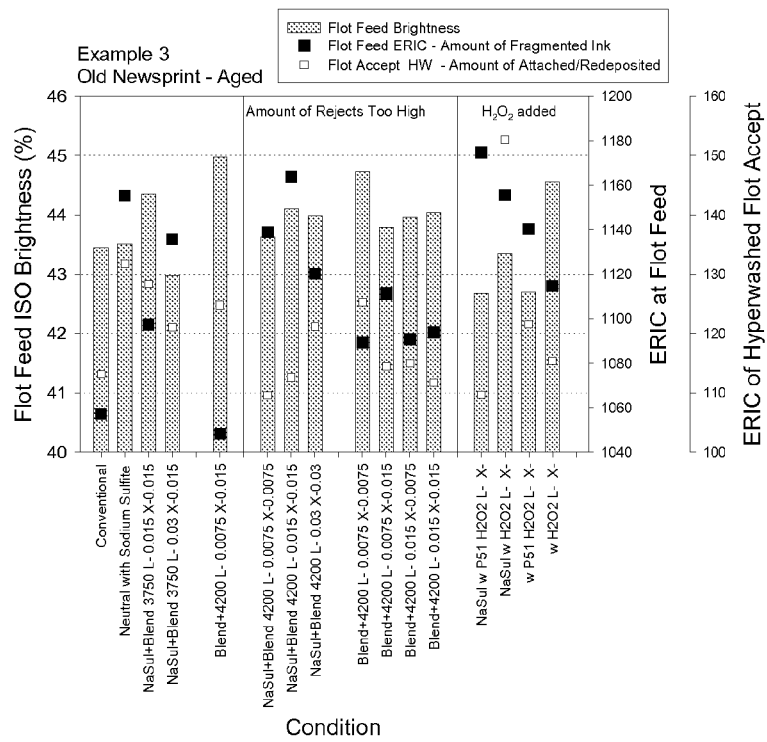
FIG. 7 is a graph showing the effect of enzymes and sodium sulfite on brightness (pulper) for Example 3 deinking systems.
Figure 8:
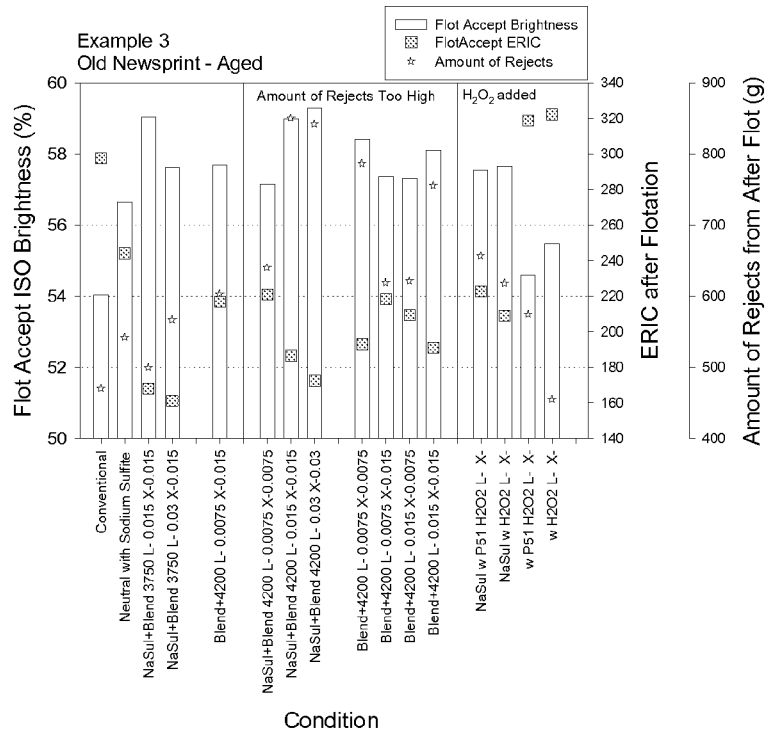
FIG. 8 is a graph showing the effect of enzymes and sodium sulfite on brightness (Flot and Hyper) for Example 3 deinking systems.
Figure 9:
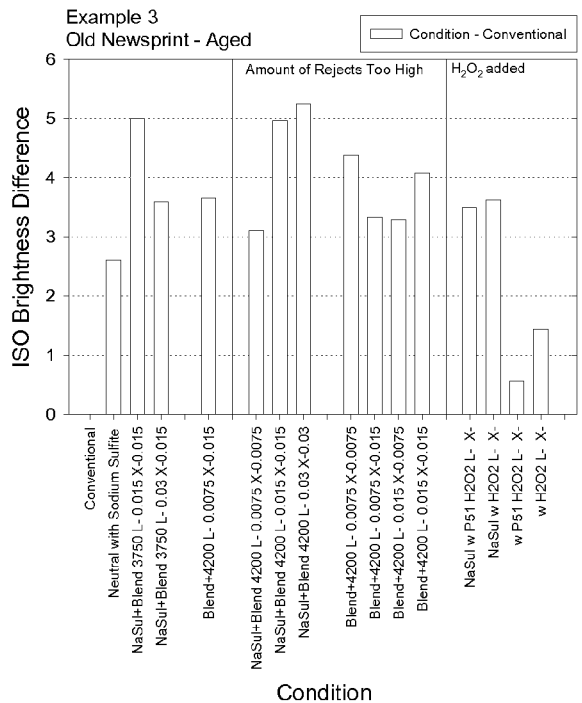
FIG. 9 is a graph showing the effect of enzymes and sodium sulfite on brightness difference (vs. conventional) for Example 3 deinking systems.
Figure 10:
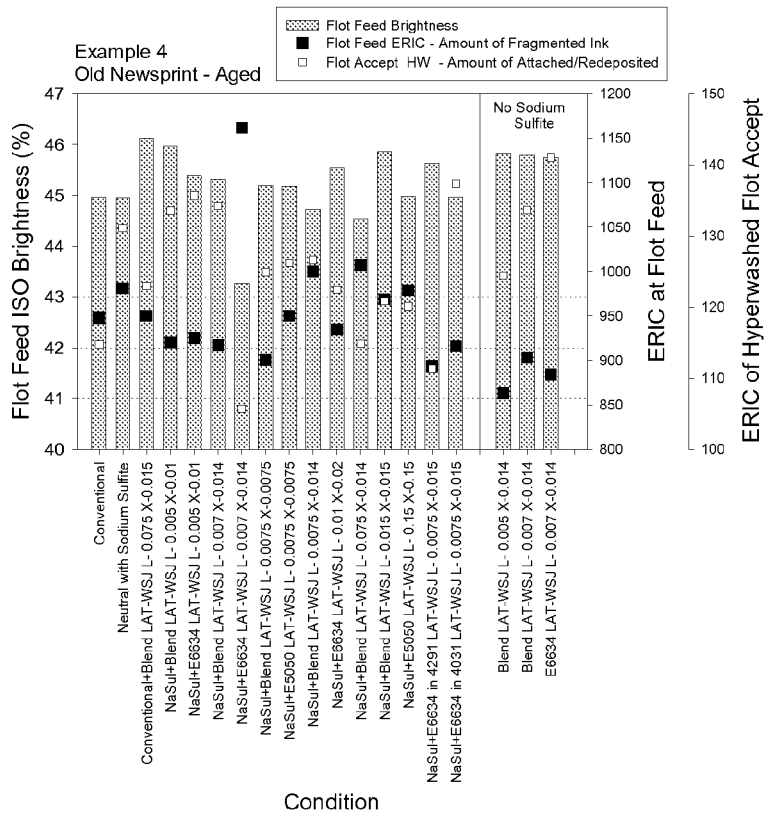
FIG. 10 is a graph showing the effect of enzymes and sodium sulfite on brightness (pulper) for Example 4 deinking systems.
Figure 11:
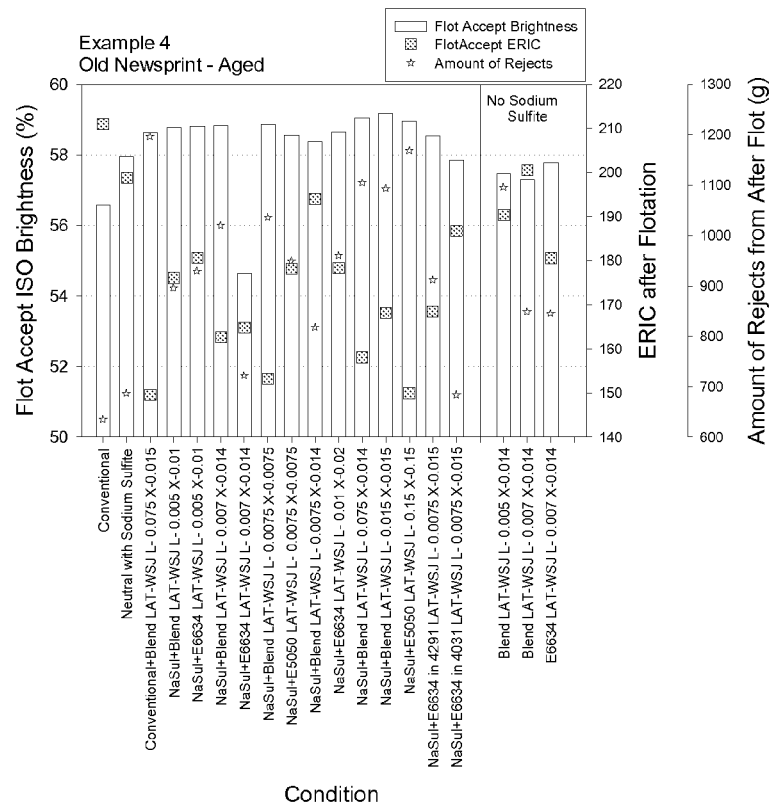
FIG. 11 is a graph showing the effect of enzymes and sodium sulfite on brightness (Flot and Hyper) for Example 4 deinking systems.
Figure 12:
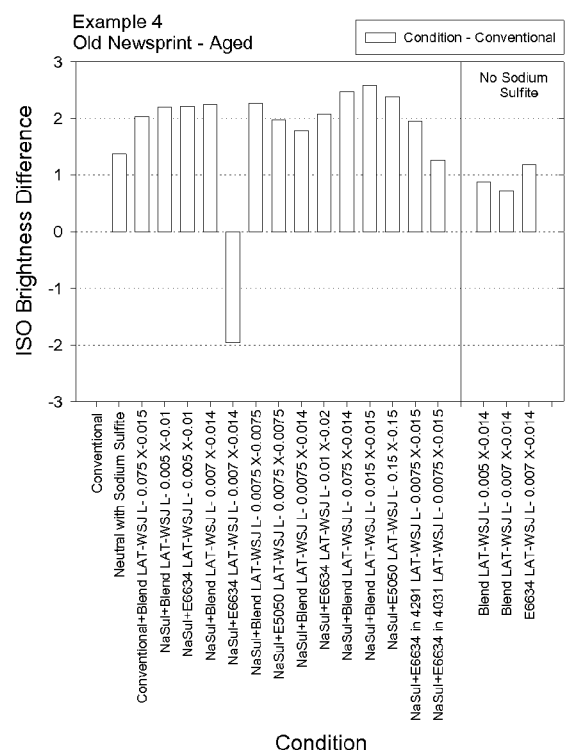
FIG. 12 is a graph showing the effect of enzymes and sodium sulfite on brightness difference (vs. conventional) for Example 4 deinking systems.
Figure 13:
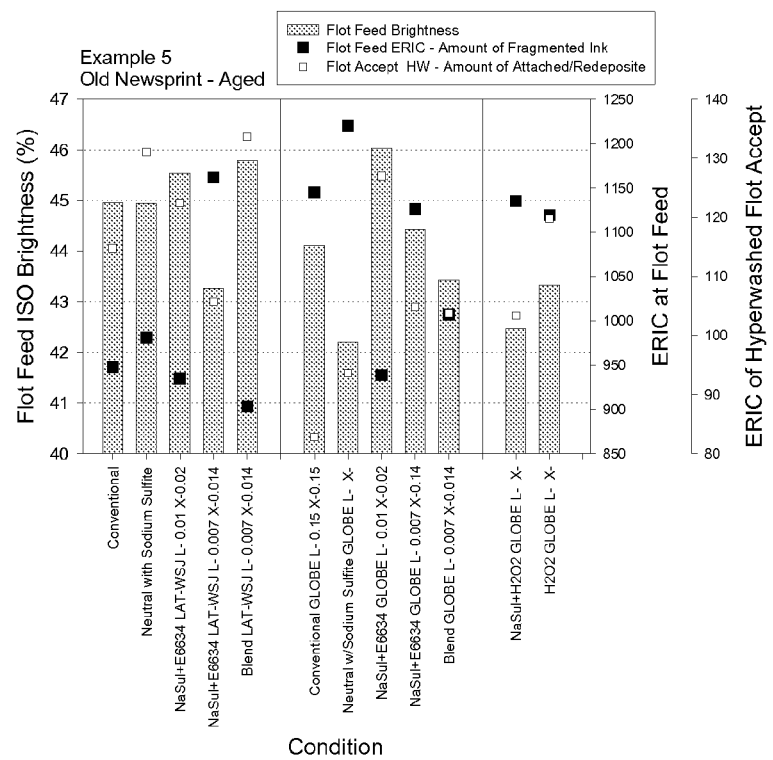
FIG. 13 is a graph showing the effect of enzymes and sodium sulfite on brightness (pulper) for Example 5 deinking systems.
Figure 14:
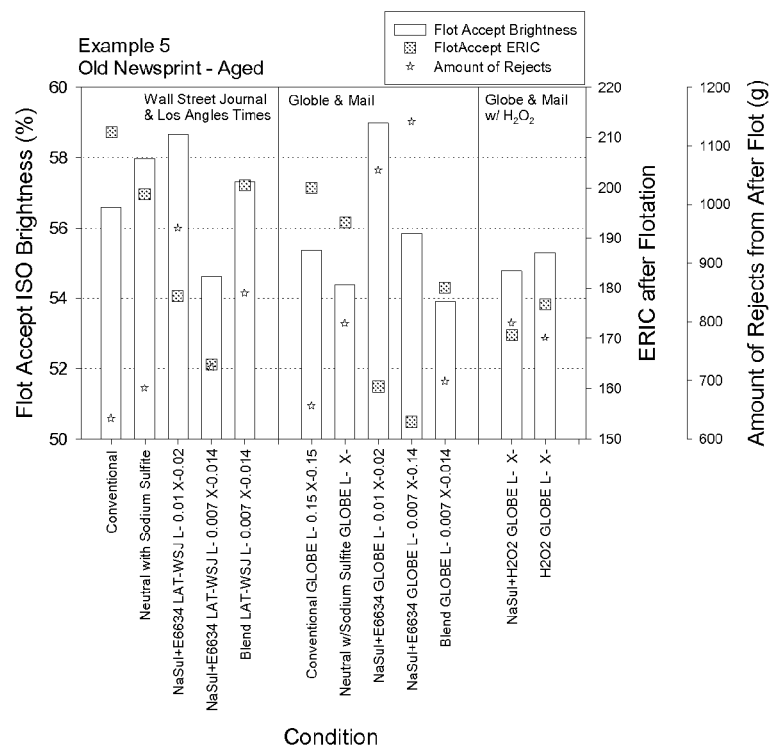
FIG. 14 is a graph showing the effect of enzymes and sodium sulfite on brightness (Flot and Hyper) for Example 5 deinking systems.
Figure 15:
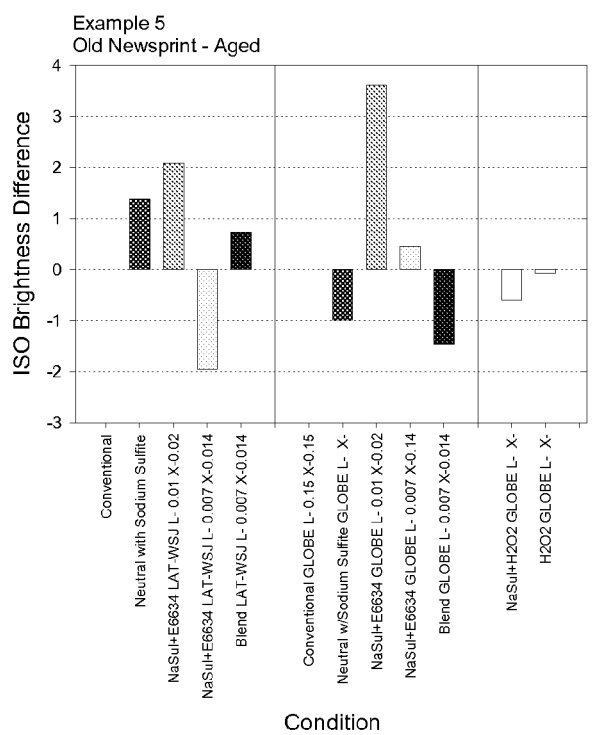
FIG. 15 is a graph showing the effect of enzymes and sodium sulfite on brightness difference (vs. conventional) for Example 5 deinking systems.
Figure 16:
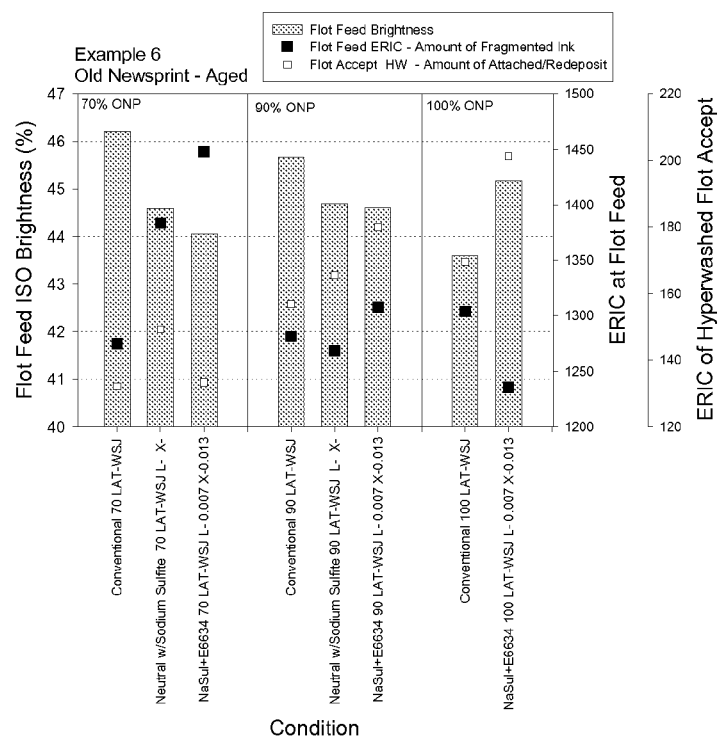
FIG. 16 is a graph showing the effect of paper source, enzymes and sodium sulfite on brightness (pulper) for Example 6 deinking systems.
Figure 17:
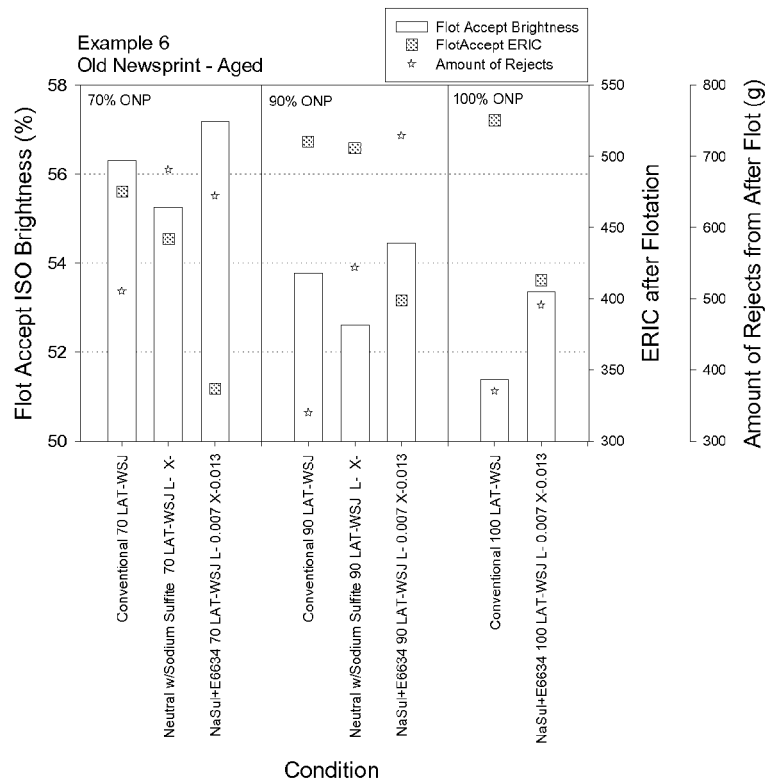
FIG. 17 is a graph showing the effect of paper source, enzymes and sodium sulfite on brightness (Flot and Hyper) for Example 6 deinking systems.
Figure 18:
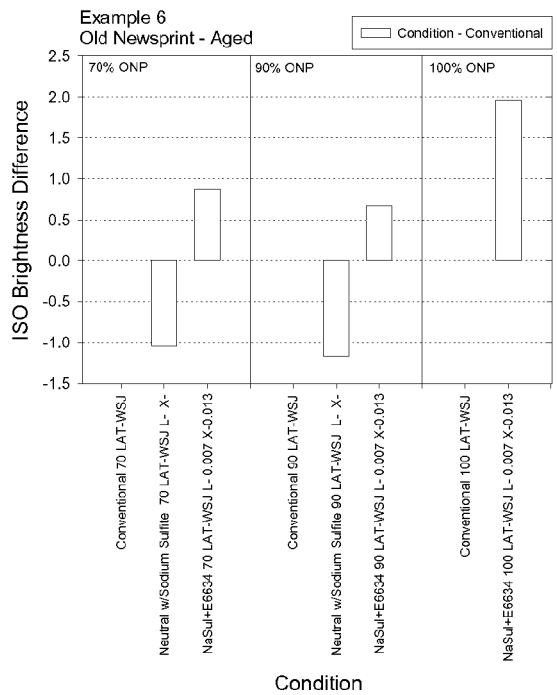
FIG. 18 is a graph showing the effect of paper source, enzymes and sodium sulfite on brightness difference (vs. conventional) for Example 6 deinking systems.
Figure 19:
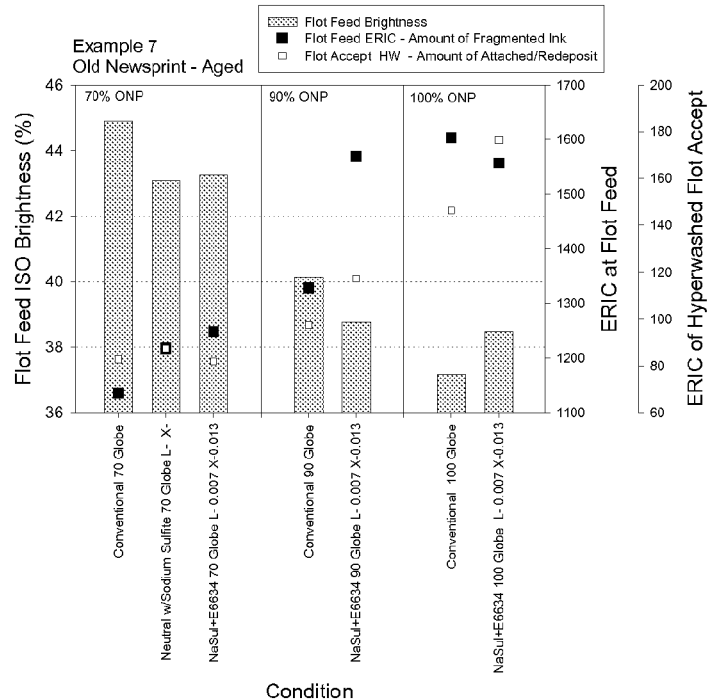
FIG. 19 is a graph showing the effect of paper source, enzymes and sodium sulfite on brightness (pulper) for Example 7 deinking systems.
Figure 20:
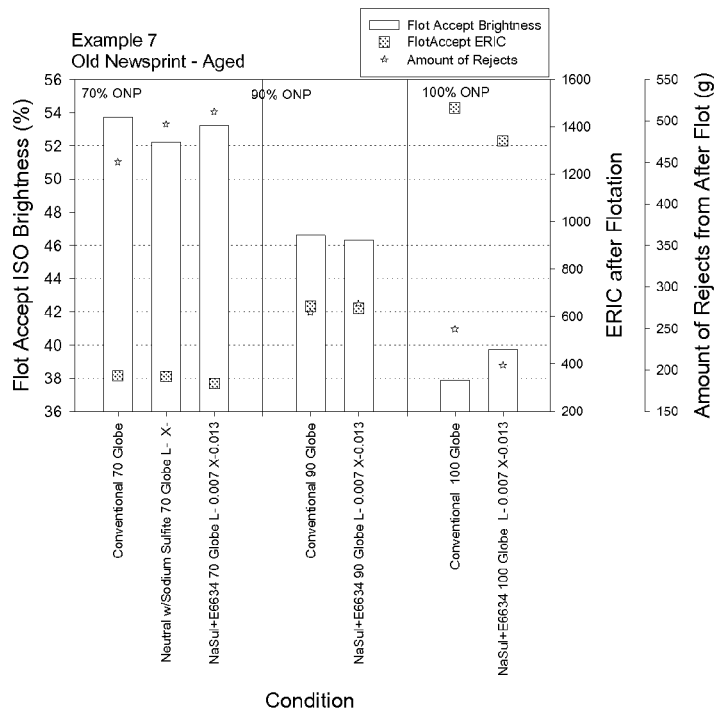
FIG. 20 is a graph showing the effect of paper source, enzymes and sodium sulfite on brightness (Flot and Hyper) for Example 7 deinking systems.
Figure 21:
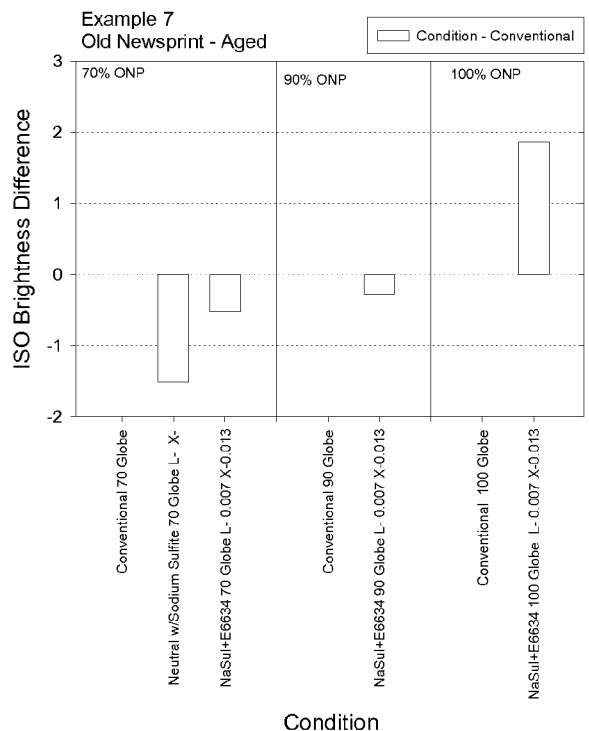
FIG. 21 is a graph showing the effect of paper source, enzymes and sodium sulfite on brightness difference (vs. conventional) for Example 7 deinking systems.

The results of the deinking tests for Example 3 are shown graphically in FIG. 7-9. A review of these figures shows that a blend of lipase and xylanase at either a ratio of 67/33 or 50/50 and a cell level of 3750 g performed better than conventional or sulfite based neutral deinking. Much of the study was conducted at a level of 4200 g which rejected too much material even with reduced enzyme dosage level. Reducing the lipase dosage to 0.0075% with 0.015% Xylanase almost gave acceptable rejects level at a cell level of 4200 g of stock. Adding hydrogen peroxide with sodium sulfite gave higher flot accept brightness but lower hyperwash brightness (less bleaching). Hydrogen peroxide without sodium sulfite gave lower flot accept brightness and higher hyperwash brightness.

Examples 4 and 5

The pulping recipes used in Examples 4 and 5 (Tests 1-30) are listed below in Table 13. The specific pulping components and conditions were: 17.5 grams each of WSJ and LAT (Example 4) and 35 grams of Globe and Mail mixed (Example 5), flotation time of 8 min, and air rate of 20 SCHF. The pH operating ranges for Examples 4 and 5 are listed below in Table 14.

TABLE 13

Pulping recipes for tests 1-30 (Examples 4 and 5).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 1 | 4200 | Conventional LAT-WSJ | Eka RF 4291 + Eka RF 4031 | | | | NA | 11.0 | 9.1 |
| 3 | 4200 | Neutral w/Sodium Sulfite LAT-WSJ | Eka RF 4291 + Eka RF 4031 | Yes | | | NA | 9.57 | 7.54 |
| 9 | 4200 | Conventional + Blend LAT-WSJ | Eka RF 4291 + Eka RF 4031 | | 0.0150 | 0.0750 | 66/34 | 11.22 | 9.09 |
| 22 | 4200 | NaSul + Blend LAT-WSJ | Eka RF 4291 + Eka RF 4031 | Yes | 0.0100 | 0.0050 | 66/34 | 9.65 | 7.68 |
| 17 | 4200 | NaSul + E6634 LAT-WSJ | Eka RF 4291 + Eka RF 4031 | Yes | 0.0100 | 0.0050 | 66/34 | 9.56 | 7.70 |
| 21 | 4200 | NaSul + Blend LAT-WSJ | Eka RF 4291 + Eka RF 4031 | Yes | 0.0140 | 0.0070 | 66/34 | 9.62 | 7.63 |
| 19 | 4200 | NaSul + E6634 LAT-WSJ | Eka RF 4291 + Eka RF 4031 | Yes | 0.0140 | 0.0070 | 66/34 | 9.56 | 8.18 |
| 13 | 4200 | NaSul + Blend LAT-WSJ | Eka RF 4291 + Eka RF 4031 | Yes | 0.0075 | 0.0075 | 50/50 | 9.62 | 7.53 |
| 14 | 4200 | NaSul + E5050 LAT-WSJ | Eka RF 4291 + Eka RF 4031 | Yes | 0.0075 | 0.0075 | 50/50 | 9.62 | 7.53 |
| 6 | 4200 | NaSul + Blend LAT-WSJ | Eka RF 4291 + Eka RF 4031 | Yes | 0.0140 | 0.0075 | 65/35 | 9.55 | 7.57 |
| 15 | 4200 | NaSul + E6634 LAT-WSJ | Eka RF 4291 + Eka RF 4031 | Yes | 0.0200 | 0.0100 | 66/34 | 9.59 | 7.64 |
| 5 | 4200 | NaSul + Blend LAT-WSJ | Eka RF 4291 + Eka RF 4031 | Yes | 0.0140 | 0.0750 | 65/35 | 9.45 | 7.50 |
| 12 | 4200 | NaSul + Blend LAT-WSJ | Eka RF 4291 + Eka RF 4031 | Yes | 0.0150 | 0.0150 | 50/50 | 9.54 | 7.46 |
| 25 | 4200 | NaSul + E6634 in 4291 LAT-WSJ | 0.0825% RF4291-E6634 | Yes | 0.0150 | 0.0075 | 66/34 | 9.60 | 7.63 |
| 26 | 4200 | NaSul + E6634 in 4031 LAT-WSJ | 0.5225% RF4031-E6634 | Yes | 0.0150 | 0.0075 | 66/34 | 9.54 | 7.69 |
| 11 | 4200 | NaSul + E5050 LAT-WSJ | Eka RF 4291 + Eka RF 4031 | Yes | 0.1500 | 0.1500 | 50/50 | 9.58 | 7.61 |
| 29 | 4200 | Blend LAT-WSJ | Eka RF 4291 + Eka RF 4031 | | 0.0140 | 0.0050 | 74/26 | 9.48 | 6.98 |
| 27 | 4200 | Blend LAT-WSJ | Eka RF 4291 + Eka RF 4031 | | 0.0140 | 0.0070 | 66/34 | 9.47 | 7.16 |
| 23 | 4200 | E6634 LAT-WSJ | Eka RF 4291 + Eka RF 4031 | | 0.0140 | 0.0070 | 66/34 | 9.44 | 7.42 |
| 10 | 4200 | Conventional GLOBE | Eka RF 4291 + Eka RF 4031 | | | | NA | 10.96 | 9.05 |
| 4 | 4200 | Neutral w/Sodium Sulfite GLOBE | Eka RF 4291 + Eka RF 4031 | Yes | | | NA | 9.35 | 7.62 |
| 20 | 4200 | NaSul + E6634 GLOBE | Eka RF 4291 + Eka RF 4031 | Yes | 0.0200 | 0.0100 | 66/34 | 9.56 | 7.58 |
| 7 | 4200 | NaSul + H2O2 GLOBE | Eka RF 4291 + Eka RF 4031 | Yes | | | NA | 9.44 | 7.21 |
| 8 | 4200 | H2O2 GLOBE | Eka RF 4291 + Eka RF 4031 | | | | NA | 9.26 | 6.85 |
| 28 | 4200 | Blend GLOBE | Eka RF 4291 + Eka RF 4031 | | 0.0140 | 0.0070 | 66/34 | 9.31 | 7.59 |
| 30 | 4200 | NaSul + E6634 GLOBE | Eka RF 4291 + Eka RF 4031 | Yes | 0.1400 | 0.0070 | 66/34 | 9.56 | 8.04 |

TABLE 14 pH ranges for Examples 4 and 5 for neutral deinking.

| | Pulping Liquor | Pulping Flot Feed |
|---|---|---|
| Max pH | 9.7 | 8.2 |
| Min pH | 9.3 | 6.9 |

The deinking performance of the various test recipes were evaluated and the results are shown below in Table 15.

TABLE 15

Deinking Results for tests 1-30 (Examples 4 and 5).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs. Sulfite | Removal Efficiency at Flot |
|---|---|---|---|---|---|---|---|---|---|---|
| 1 | 635 | 948 | 211 | 115 | 45.0 | 56.6 | 59.1 | NA | −1.4 | 77.7 |
| 3 | 686 | 981 | 199 | 131 | 45.0 | 58.0 | 57.6 | 1.4 | NA | 79.7 |
| 9 | 1196 | 950 | 150 | 123 | 46.1 | 58.6 | 57.8 | 2.0 | 0.7 | 84.3 |
| 22 | 895 | 920 | 176 | 134 | 46.0 | 58.8 | 56.7 | 2.2 | 0.8 | 80.9 |
| 17 | 929 | 925 | 181 | 136 | 45.4 | 58.8 | 55.8 | 2.2 | 0.8 | 80.5 |
| 21 | 1019 | 917 | 163 | 134 | 45.3 | 58.8 | 57.1 | 2.2 | 0.9 | 82.3 |
| 19 | 722 | 1161 | 165 | 106 | 43.3 | 54.6 | 54.0 | −2.0 | −3.3 | 85.8 |
| 13 | 1035 | 901 | 153 | 125 | 45.2 | 58.9 | 57.8 | 2.3 | 0.9 | 83.0 |
| 14 | 949 | 950 | 178 | 126 | 45.2 | 58.6 | 56.8 | 2.0 | 0.6 | 81.3 |
| 6 | 817 | 1000 | 194 | 127 | 44.7 | 58.4 | 57.1 | 1.8 | 0.4 | 80.6 |
| 15 | 959 | 935 | 178 | 122 | 45.5 | 58.7 | 57.6 | 2.1 | 0.7 | 80.9 |
| 5 | 1104 | 1007 | 158 | 115 | 44.5 | 59.1 | 57.3 | 2.5 | 1.1 | 84.3 |
| 12 | 1092 | 969 | 168 | 121 | 45.9 | 59.2 | 57.7 | 2.6 | 1.2 | 82.6 |
| 25 | 912 | 894 | 168 | 111 | 45.6 | 58.5 | 56.9 | 1.9 | 0.6 | 81.2 |
| 26 | 684 | 916 | 187 | 137 | 45.0 | 57.8 | 56.2 | 1.3 | −0.1 | 79.6 |
| 11 | 1168 | 979 | 150 | 120 | 45.0 | 59.0 | 56.8 | 2.4 | 1.0 | 84.7 |
| 29 | 1095 | 863 | 190 | 124 | 45.8 | 57.5 | 56.7 | 0.9 | −0.5 | 77.9 |
| 27 | 848 | 903 | 201 | 134 | 45.8 | 57.3 | 56.2 | 0.7 | −0.7 | 77.8 |
| 23 | 844 | 884 | 181 | 141 | 45.7 | 57.8 | 56.0 | 1.2 | −0.2 | 79.6 |
| 10 | 656 | 1145 | 200 | 83 | 44.1 | 55.4 | 57.6 | NA | 1.0 | 82.5 |
| 4 | 797 | 1220 | 193 | 94 | 42.2 | 54.4 | 52.6 | −1.0 | NA | 84.2 |
| 20 | 1058 | 939 | 160 | 127 | 46.0 | 59.0 | 57.1 | 3.6 | 4.6 | 82.9 |
| 7 | 798 | 1135 | 171 | 103 | 42.5 | 54.8 | 54.9 | −0.6 | 0.4 | 85.0 |
| 8 | 772 | 1119 | 177 | 120 | 43.3 | 55.3 | 54.9 | −0.1 | 0.9 | 84.2 |
| 28 | 698 | 1007 | 180 | 104 | 43.4 | 53.9 | 54.0 | −1.5 | −0.5 | 82.1 |
| 30 | 1141 | 1126 | 153 | 105 | 44.4 | 55.8 | 55.1 | 0.5 | 1.4 | 86.4 |

In addition to the results in Table 15, the following was observed: tests 5, 9, 11-15, 17, 20-22, 25, 29 and 30 had too much wet rejects. For this Example a reject amount over about 850 g was considered too high a yield loss.

The results of the deinking tests for Examples 4 and 5 are shown graphically in FIG. 10-15. A review of these figures shows that a mixture of lipase and xylanase at either a ratio of 66/34 or 50/50 was compared to enzymes added separately and blended in pulper. The results were found to be the same or better when enzymes were mixed. Addition of enzymes to non-ionic surfactant gave better ink detachment and is best option if reject level is controlled. Removing the sodium sulfite lowered the amount of rejects in most cases. The Globe and Mail furnish saw no benefit adding peroxide with the sulfite chemistry and a slight benefit with sodium sulfite. Higher dosages of enzymes did not increase deinking performance.

Example 6 and 7

The pulping recipes used in Examples 6 and 7 (Tests 1 to 17) are listed below in Table 16. The specific pulping components and conditions were: 17.5 grams each of WSJ and LAT (Example 6) and 35 grams of Globe and Mail mixed (Example 7), flotation time of 8 min, and air rate of 20 SCHF. The pH operating ranges for Examples 6 and 7 are listed below in Table 17.

TABLE 16

Pulping recipes for tests 1-17 (Examples 6 and 7).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 1 | 4200 | Conventional 70 LAT-WSJ | Eka RF 4291 + Eka RF 4031 | | | | NA | 11.2 | 9.1 |
| 9 | 4200 | Neutral w/Sodium Sulfite 70 LAT-WSJ | Eka RF 4291 + Eka RF 4031 | Yes | | | NA | 9.6 | 8.4 |
| 12 | 4200 | NaSul + E6634 70 LAT-WSJ | Eka RF 4291 + Eka RF 4031 | Yes | 0.013 | 0.007 | 66/34 | 9.6 | 8.4 |
| 3 | 4200 | Conventional 90 LAT-WSJ | Eka RF 4291 + Eka RF 4031 | | | | NA | 11.2 | 9.5 |
| 11 | 4200 | Neutral w/Sodium Sulfite 90 LAT-WSJ | Eka RF 4291 + Eka RF 4031 | Yes | | | NA | 9.5 | 8.4 |
| 14 | 4200 | NaSul + E6634 90 LAT-WSJ | Eka RF 4291 + Eka RF 4031 | Yes | 0.013 | 0.007 | 66/34 | 9.6 | 8.2 |
| 4 | 4200 | Conventional 100 LAT-WSJ | Eka RF 4291 + Eka RF 4031 | | | | NA | 11.1 | 9.0 |
| 16 | 4200 | NaSul + E6634 100 LAT-WSJ | Eka RF 4291 + Eka RF 4031 | Yes | 0.013 | 0.007 | 66/34 | 9.5 | 8.4 |

TABLE 16-continued

Pulping recipes for tests 1-17 (Examples 6 and 7).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 5 | 4200 | Conventional 70 Globe | Eka RF 4291 + Eka RF 4031 | | | | NA | 11.1 | 9.0 |
| 10 | 4200 | Neutral w/Sodium Sulfite 70 Globe | Eka RF 4291 + Eka RF 4031 | Yes | | | NA | 9.6 | 8.1 |
| 13 | 4200 | NaSul + E6634 70 Globe | Eka RF 4291 + Eka RF 4031 | Yes | 0.013 | 0.007 | 66/34 | 9.5 | 8.2 |
| 7 | 4200 | Conventional 90 Globe | Eka RF 4291 + Eka RF 4031 | | | | NA | 11.1 | 9.0 |
| 15 | 4200 | NaSul + E6634 90 Globe | Eka RF 4291 + Eka RF 4031 | Yes | 0.013 | 0.007 | 66/34 | 9.6 | 8.1 |
| 8 | 4200 | Conventional 100 Globe | Eka RF 4291 + Eka RF 4031 | | | | NA | 11.1 | 8.9 |
| 17 | 4200 | NaSul + E6634 100 Globe | Eka RF 4291 + Eka RF 4031 | Yes | 0.013 | 0.007 | 66/34 | 9.6 | 7.8 |

TABLE 17 pH ranges for Examples 6 and 7 for neutral deinking.

| | Pulping Liquor pH | FF pH |
|---|---|---|
| Max pH | 9.6 | 8.4 |
| Min pH | 9.5 | 7.8 |

The deinking performance of the various test recipes were evaluated and the results are shown below in Table 18.

TABLE 18

Deinking Results for tests 1-30 (Examples 6 and 7).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs Sulfite | Removal Efficiency at Flot |
|---|---|---|---|---|---|---|---|---|---|---|
| 1 | 510 | 1275 | 475 | 132 | 46.2 | 56.3 | 61.3 | NA | 1.0 | 72.2 |
| 9 | 681 | 1384 | 442 | 149 | 44.6 | 55.3 | 57.0 | −1.0 | NA | 66.2 |
| 12 | 644 | 1448 | 337 | 133 | 44.1 | 57.2 | 58.3 | 0.9 | 1.9 | 60.4 |
| 3 | 340 | 1281 | 510 | 157 | 45.7 | 53.8 | 59.1 | NA | 1.2 | 69.3 |
| 11 | 543 | 1268 | 505 | 166 | 44.7 | 52.6 | 56.3 | −1.2 | NA | 67.3 |
| 14 | 729 | 1308 | 399 | 180 | 44.6 | 54.4 | 56.0 | 0.7 | 1.8 | 54.9 |
| 4 | 370 | 1304 | 525 | 170 | 43.6 | 51.4 | 57.5 | NA | −2.0 | 67.7 |
| 16 | 491 | 1236 | 413 | 201.2 | 45.2 | 53.4 | 54.2 | 2.0 | NA | 51.3 |
| 5 | 450 | 1137 | 350 | 83 | 44.9 | 53.7 | 57.5 | NA | 1.5 | 76.4 |
| 10 | 496 | 1218 | 347 | 87 | 43.1 | 52.2 | 53.9 | −1.5 | NA | 74.8 |
| 13 | 510 | 1249 | 318 | 81.85 | 43.2 | 53.2 | 54.2 | −0.5 | 1.0 | 74.2 |
| 7 | 269 | 1328 | 644 | 98 | 40.1 | 46.6 | 54.8 | NA | NA | 84.8 |
| 15 | 279 | 1569 | 635 | 117.3 | 38.8 | 46.3 | 51.5 | −0.3 | NA | 81.5 |
| 8 | 249 | 1603 | 1480 | 147 | 37.2 | 37.9 | 52.9 | NA | NA | 90.1 |
| 17 | 205 | 1557 | 1339 | 176.6 | 38.5 | 39.8 | 50.4 | 1.9 | NA | 86.8 |

For this Example a reject amount over about 700 g was considered too high a yield loss. In addition to the results in Table 18, the following was observed: tests 14 had too much wet rejects.

The results of the deinking tests for Examples 6 and 7 are shown graphically in FIGS. 16-21. As expected increasing ONP content dropped the amount of rejects and lowered brightness. The addition of the mixture of enzymes with sulfite based neutral deinking gave higher flot accept brightness than conventional of 1 (70%), 0.5 (90%) and 2 (100%) points for the LAT/WSJ combination in Example 6. For Example 7, Globe and Mail it was −0.5 (70%), −0.3 (90%) and 2 (100%) points. The foaming nature helped when using 100% ONP for both examples. The ink type for the Globe and Mail showed a significant drop in brightness and ability to be deinked when going to 100% ONP due to low levels of rejects. The use of this enzyme mixture will allow mills to use a higher ONP content while maintaining deinking performance.

Example 8

The pulping recipes used in Example 8 (Tests 1 to 7) are listed below in Table 19. The specific pulping components and conditions were: 17.5 grams each of WSJ and LAT, flotation time of 8 min, and air rate of 20 SCHF. The pH operating ranges for Example 8 is listed below in Table 20.

TABLE 19

Pulping recipes for tests 1-7 (Example 8).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 1 | 4200 | Conventional | Eka RF 4291 + Eka RF 4031 | | | | NA | 11.3 | 8.9 |
| 3 | 4200 | Neutral with Sodium Sulfite LAT | Eka RF 4291 + Eka RF 4031 | Yes | | | NA | 9.6 | 7.2 |
| 4 | 4200 | E5050 | Eka RF 4291 + Eka RF 4031 | | 0.01 | 0.01 | 50/50 | 9.3 | 6.9 |
| 5 | 4200 | E6634 | Eka RF 4291 + Eka RF 4031 | | 0.013 | 0.007 | 66/34 | 9.3 | 7.2 |
| 6 | 4200 | E7525 | Eka RF 4291 + Eka RF 4031 | | 0.015 | 0.005 | 75/25 | 9.4 | 7.2 |
| 7 | 4200 | Blend | Eka RF 4291 + Eka RF 4031 | | 0.015 | 0.005 | 75/25 | 9.7 | 7.2 |

TABLE 20 pH ranges for Example 8 for neutral deinking.

| | Pulping Liquor pH | FF pH |
|---|---|---|
| Max pH | 9.7 | 7.2 |
| Min pH | 9.3 | 6.9 |

The deinking performance of the various test recipes were evaluated and the results are shown below in Table 21.

TABLE 21

Deinking Results for tests 1-7 (Example 8).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs Sulfite | Removal Efficiency at Flot |
|---|---|---|---|---|---|---|---|---|---|---|
| 1 | 932 | 759 | 206 | 110 | 45.6 | 56.3 | 58.1 | NA | 1.2 | 72.9 |
| 3 | 897 | 729 | 225 | 126 | 45.5 | 56.1 | 55.7 | 0.9 | NA | 69.1 |
| 4 | 1367 | 681 | 202 | 143 | 45.4 | 55.4 | 54.4 | 0.3 | 0.4 | 70.4 |
| 5 | 1229 | 714 | 207 | 145 | 45.2 | 55.1 | 55.2 | 0.0 | 0.1 | 71.0 |
| 6 | 1166 | 727 | 223 | 139 | 45.2 | 55.0 | 55.0 | −0.1 | 0.0 | 69.4 |
| 7 | 1009 | 677 | 243 | 140 | 45.7 | 54.7 | 54.1 | −0.5 | −0.4 | 64.2 |

For this Example a reject amount over about 1130 g was considered too high a yield loss. In addition to the results in Table 21, the following was observed: tests 4 to 6 had too much wet rejects.

Figure 22:
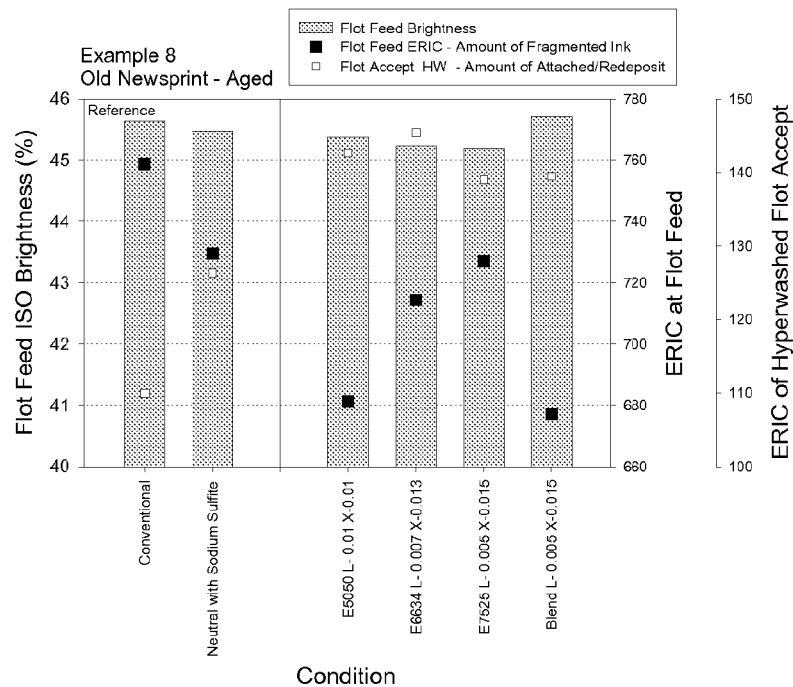
FIG. 22 is a graph showing the effect of enzymes and sodium sulfite on brightness (pulper) for Example 8 deinking systems.
Figure 23:
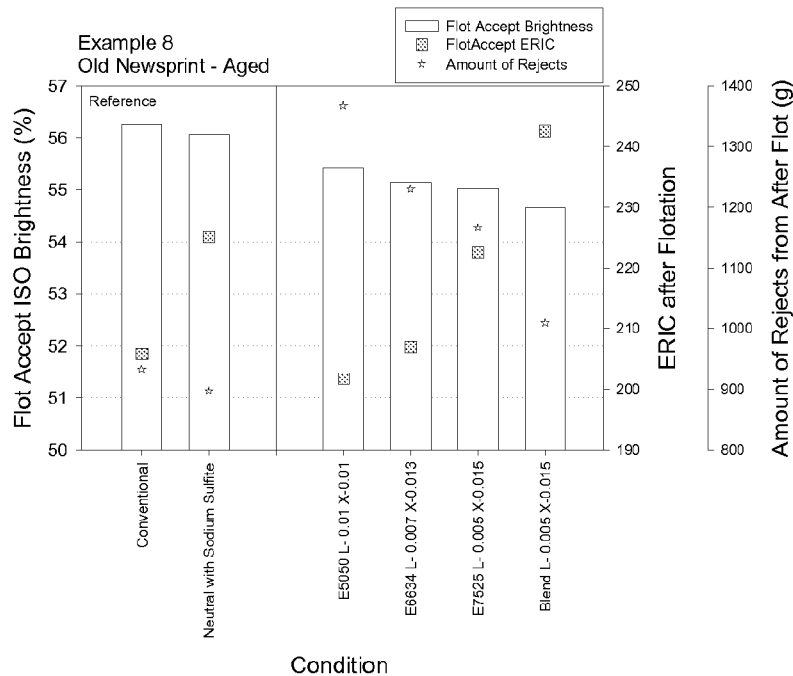
FIG. 23 is a graph showing the effect of enzymes and sodium sulfite on brightness (Flot and Hyper) for Example 8 deinking systems.
Figure 24:
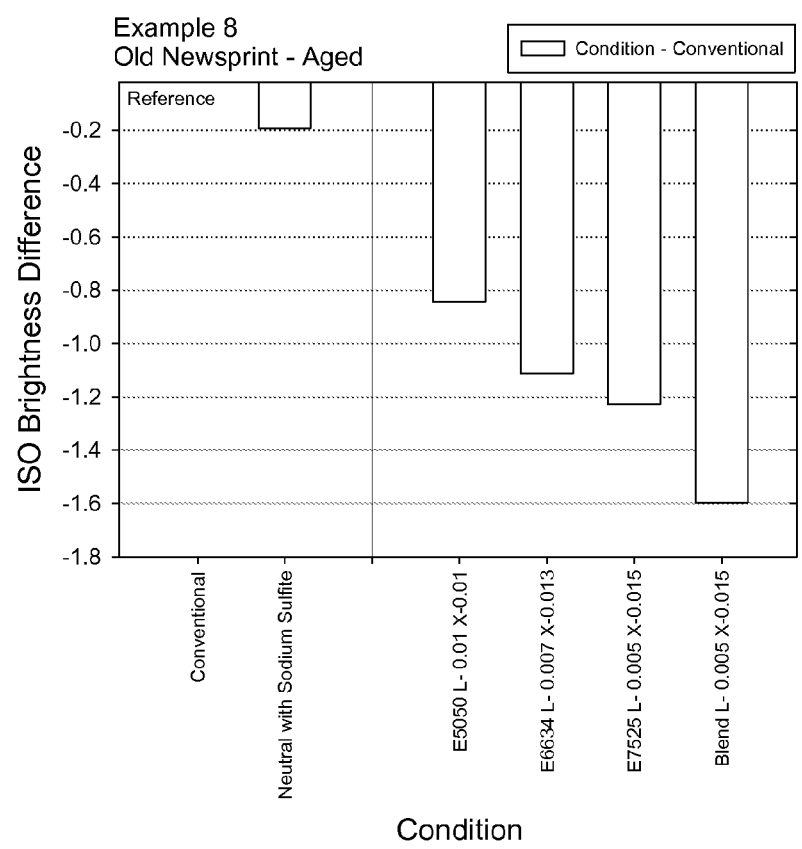
FIG. 24 is a graph showing the effect of enzymes and sodium sulfite on brightness difference (vs. conventional) for Example 8 deinking systems.

The results of the deinking tests for Example 8 are shown graphically in FIGS. 22-24. This study looked at removing sodium sulfite and at ratios of xylanase/lipase of 50/50, 66/34 and 75/25 with a dosage of 0.02%. Going to a ratio of 75/25 dropped the reject level to an acceptable level. Mixing the two together gave about 0.5 points better brightness than adding the two enzymes separately and a lower rejects level. Flot Accept brightness was lower than conventional for this study but within the two point criteria and a difference of about 1.2 points. The study also showed further adjustments needed to control the amount of wet rejects when the sodium sulfite was removed.

Example 9

The pulping recipes used in Example 9 (Tests 1 to 14) are listed below in Table 22. The specific pulping components and conditions were: 17.5 grams each of WSJ and LAT, flotation time of 8 min, and air rate of 20 SCHF. The pH operating ranges for Example 8 is listed below in Table 23.

TABLE 22

Pulping recipes for tests 1-14 (Example 9).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 1 | 4200 | conv | Eka RF 4291 + Eka RF 4031 | | | | NA | 11.7 | 9.3 |
| 3 | 4200 | S-Quad | Eka RF 4291 + Eka RF 4031 | Yes | | | NA | 9.5 | 9.4 |

TABLE 22-continued

Pulping recipes for tests 1-14 (Example 9).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 8 | 4200 | no sulfite P0.5—NI 0.03—Si 0.5 | Eka RF 4291 + Eka RF 4031 | | | | NA | 8.8 | 7.2 |
| 9 | 4200 | no sulfite P1.5—NI 0.03—Si 1.5 | Eka RF 4291 + Eka RF 4031 | | | | NA | 9.1 | 7.2 |
| 13 | 4200 | no sulfite P 0.5—NI 0.06—Si 1.0 | Eka RF 4291 + Eka RF 4031 | | | | NA | 9.0 | 7.2 |
| 11 | 4200 | no sulfite P0.5—NI 0.09—Si 1.5 | Eka RF 4291 + Eka RF 4031 | | | | NA | 9.1 | 7.2 |
| 5 | 4200 | no sulfite P1.0—NI 0.06—Si 1.0 | Eka RF 4291 + Eka RF 4031 | | | | NA | 9.2 | 7.1 |
| 14 | 4200 | no sulfite P51 1.0—NI 0.06—Si 1.5 | Eka RF 4291 + Eka RF 4031 | | | | NA | 9.3 | 7.2 |
| 4 | 4200 | no sulfite P1.5—NI 0.03—Si 0.5 | Eka RF 4291 + Eka RF 4031 | | | | NA | 8.9 | 7.3 |
| 7 | 4200 | no sulfite P1.5—NI 0.09—Si 0.5 | Eka RF 4291 + Eka RF 4031 | | | | NA | 9.1 | 7.1 |
| 12 | 4200 | no sulfite P1.5—NI 0.09—Si 0.5 | Eka RF 4291 + Eka RF 4031 | | | | NA | 9.2 | 7.2 |

TABLE 23 pH ranges for Example 9 for neutral deinking

| Neutral Deinking pH range | Pulping Liquor pH | FF pH |
|---|---|---|
| Max pH | 9.5 | 9.4 |
| Min pH | 8.8 | 7.1 |

The deinking performance of the various test recipes were evaluated and the results are shown below in Table 24.

TABLE 24

Deinking Results for tests 1-14 (Example 9).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs Sulfite | Removal Efficiency at Flot |
|---|---|---|---|---|---|---|---|---|---|---|
| 1 | 721 | 1157 | 403 | 155 | 41.1 | 48.0 | 50.5 | NA | −3.0 | 61.5 |
| 3 | 735 | 1203 | 380 | 181 | 43.6 | 53.2 | 53.6 | 1.9 | NA | 52.4 |
| 8 | 683 | 1260 | 456 | 231 | 42.8 | 51.8 | 52.7 | 0.5 | 0.9 | 49.3 |
| 9 | 593 | 1272 | 511 | 236 | 42.8 | 51.3 | 52.0 | 0.0 | 0.4 | 53.7 |
| 13 | 633 | 1141 | 517 | 215 | 43.8 | 50.9 | 49.8 | −0.4 | 0.0 | 58.5 |
| 11 | 444 | 1342 | 611 | 249 | 42.5 | 50.5 | 51.4 | −0.8 | −0.4 | 59.3 |
| 5 | 601 | 1260 | 463 | 233 | 42.7 | 52.0 | 52.5 | 0.7 | 1.0 | 49.6 |
| 14 | 563 | 1204 | 562 | 232 | 43.7 | 51.0 | 52.1 | −0.3 | 0.1 | 58.8 |
| 4 | 782 | 1289 | 423 | 208 | 42.8 | 52.6 | 53.3 | 1.3 | 1.7 | 50.9 |
| 7 | 726 | 1175 | 408 | 229 | 42.4 | 51.5 | 51.4 | 0.2 | 0.6 | 43.9 |
| 12 | 656 | 1311 | 437 | 248 | 42.2 | 52.3 | 51.7 | 1.0 | 1.4 | 43.3 |

For this Example a reject amount over about 920 g was considered too high a yield loss. In addition to the results in Table 24, the following was observed: no tests had too much wet rejects.

Figure 25:
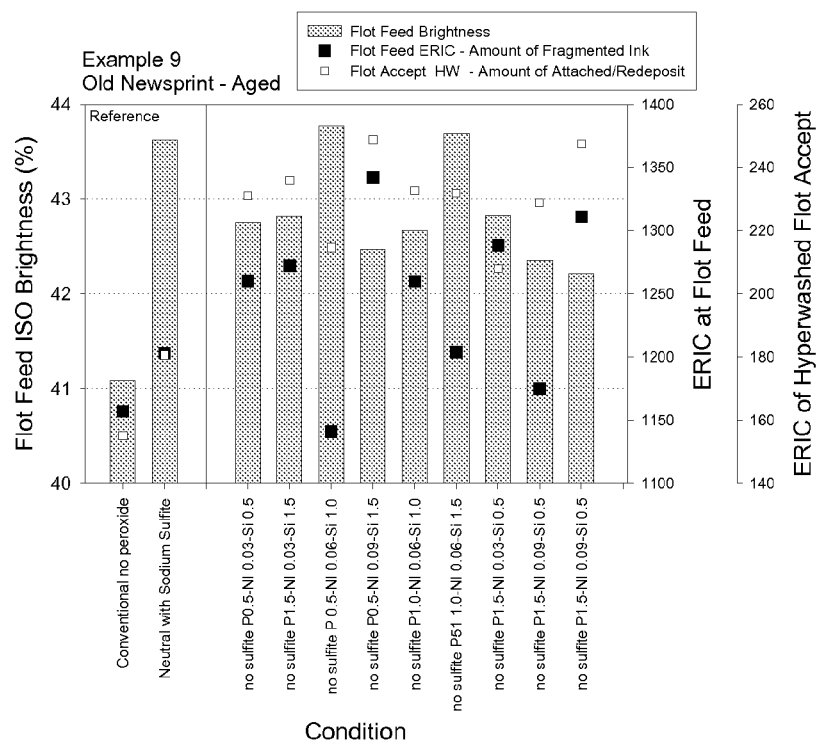
FIG. 25 is a graph showing the effect of enzymes and sodium sulfite on brightness (pulper) for Example 9 deinking systems.
Figure 26:
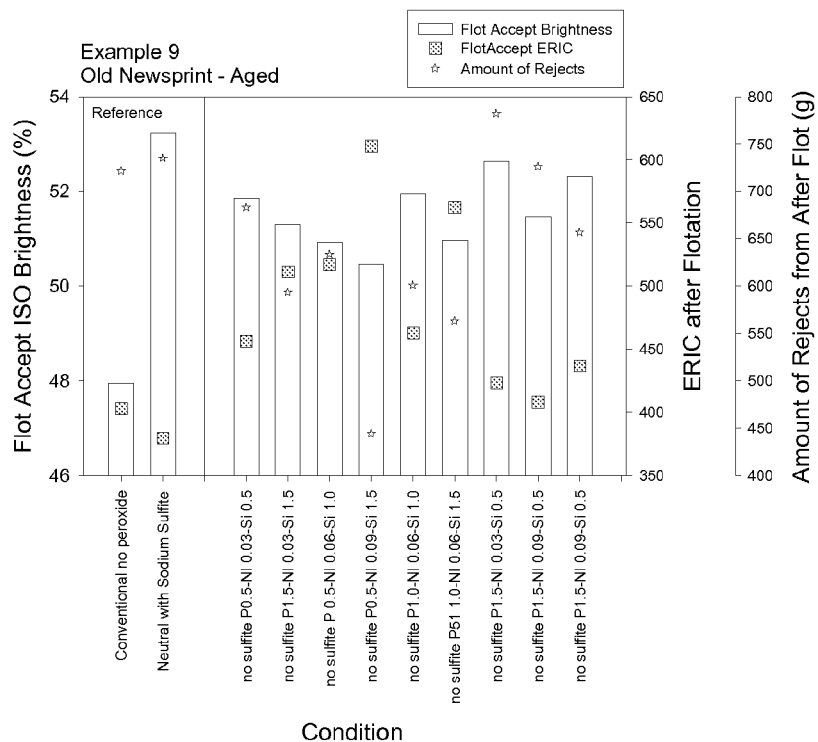
FIG. 26 is a graph showing the effect of enzymes and sodium sulfite on brightness (Flot and Hyper) for Example 9 deinking systems.

The results of the deinking tests for Example 9 are shown graphically in FIGS. 25-26. This study looked at adding hydrogen peroxide without adding caustic and without adding sodium sulfite. A testing error resulted in no hydrogen peroxide being added to the conventional pulper chemistry which produced darker paper due to bleach removal and caustic yellowing. The removal of sodium sulfite and the enzymes resulted in a large increase in ink redeposition as seen with ERIC hyperwash averaging 226 for neutral deinking. Dropping the sodium silicate dosage to 0.5% gave better ink removal and higher brightness but was due to a higher amount of rejects. The sodium silicate is helping to reduce reject volume during neutral deinking.

Example 10

The pulping recipes used in Example 10 (Tests 1 to 14) are listed below in Table 25. The specific pulping components and conditions were: 35 grams each of WSJ, LAT or Globe and Mail, flotation time of 5 min, and air rate of 15 SCHF. The pH operating ranges for Example 10 is listed below in Table 26.

TABLE 25

Pulping recipes for tests 1-14 (Example 10).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 1 | 4200 | Conventional - LAT | Eka RF 4291 + Eka RF 4031 | | | | NA | 11.02 | 9.24 |
| 13 | 4200 | Neutral with Sodium Sulfite LAT | Eka RF 4291 + Eka RF 4031 | Yes | | | NA | 9.63 | 8.50 |
| 14 | 4100 | E6634 LAT-4100 | Eka RF 4291 + Eka RF 4031 | | 0.013 | 0.07 | 66/34 | 9.54 | 8.13 |
| 3 | 4200 | Conventional - WSJ | Eka RF 4291 + Eka RF 4031 | | | | NA | 11.02 | 9.58 |
| 4 | 4200 | Neutral with Sodium Sulfite-WSJ | Eka RF 4291 + Eka RF 4031 | Yes | | | NA | 9.52 | 8.34 |
| 5 | 4100 | E6634-WSJ-4100 | Eka RF 4291 + Eka RF 4031 | | 0.013 | 0.07 | 66/34 | 9.34 | 8.45 |
| 2 | 4200 | Conventional - GLOBE | Eka RF 4291 + Eka RF 4031 | | | | NA | 11.03 | 9.02 |
| 8 | 4200 | Neutral with Sodium Sulfite - GLOBE | Eka RF 4291 + Eka RF 4031 | Yes | | | NA | 9.64 | 8.01 |
| 7 | 4100 | E6634 - GLOBE-4100 | Eka RF 4291 + Eka RF 4031 | | 0.013 | 0.07 | 66/34 | 9.32 | 7.86 |

TABLE 26 pH ranges for Example 10 for neutral deinking

| Neutral Deinking pH range | Pulping Liquor pH | FF pH |
|---|---|---|
| Max pH | 9.6 | 8.5 |
| Min pH | 9.3 | 7.9 |

The deinking performance of the various test recipes were evaluated and the results are shown below in Table 27.

TABLE 27

Deinking Results for tests 1-14 (Example 10).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs Sulfite | Removal Efficiency at Flot |
|---|---|---|---|---|---|---|---|---|---|---|
| 1 | 180 | 937 | 461 | 201 | 42.02 | 48.03 | 53.94 | NA | -1.4 | 56.4 |
| 13 | 242 | 1202 | 382 | 243 | 38.62 | 49.45 | 50.15 | 1.4 | NA | 36.3 |
| 14 | 87 | 958 | 421 | 177 | 41.26 | 48.39 | 48.16 | 0.4 | -1.1 | 57.9 |
| 3 | 388 | 932 | 310 | 107 | 48.30 | 57.39 | 59.84 | NA | -0.2 | 65.6 |
| 4 | 388 | 976 | 343 | 141 | 47.75 | 57.58 | 58.14 | 0.2 | NA | 59.0 |
| 5 | 308 | 889 | 338 | 212 | 49.10 | 57.22 | 57.59 | -0.2 | -0.4 | 37.1 |
| 2 | 491 | 1005 | 345 | 141 | 45.62 | 53.83 | 56.96 | NA | -0.1 | 59.0 |
| 8 | 582 | 1284 | 298 | 190 | 42.33 | 53.96 | 54.20 | 0.1 | NA | 36.4 |
| 7 | 649 | 944 | 308 | 141 | 44.95 | 52.95 | 53.97 | -0.9 | -1.0 | 54.2 |

For this Example a reject amount over about 380 g (LA Times), 590 (WSJ) or 690 (Globe and Mail) was considered too high a yield loss. In addition to the results in Table 27, the following was observed: no tests had too much wet rejects.

Figure 27:
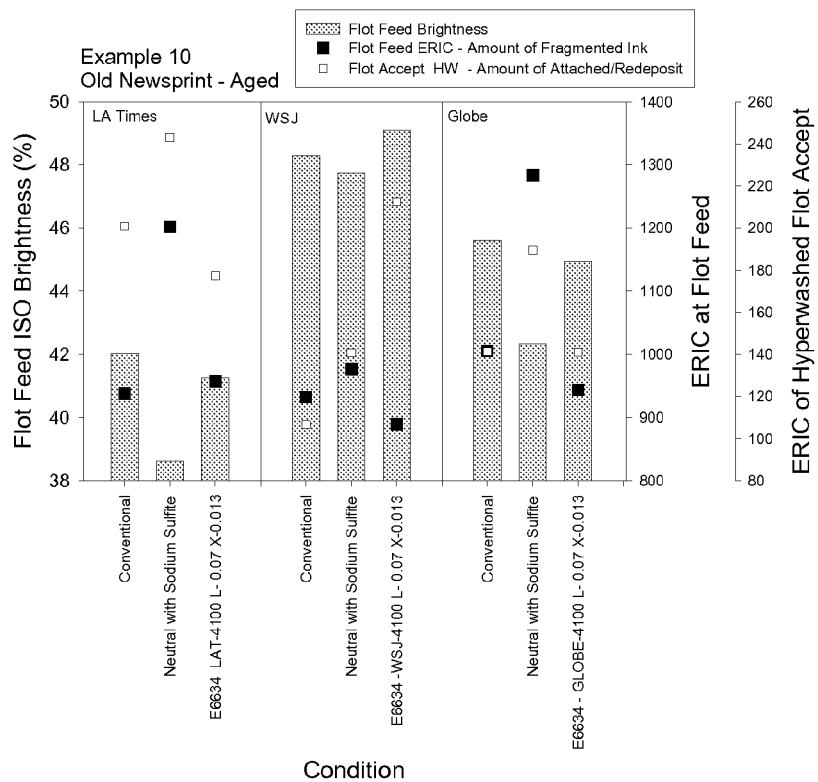
FIG. 27 is a graph showing the effect of paper source, enzymes and sodium sulfite on brightness (pulper) for Example 10 deinking systems.
Figure 28:
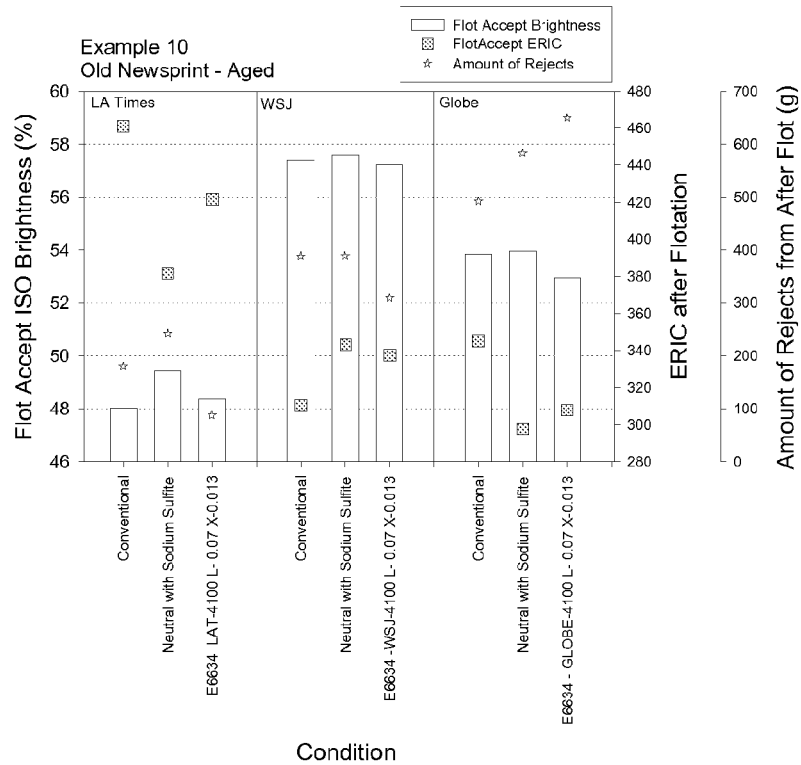
FIG. 28 is a graph showing the effect of paper source, enzymes and sodium sulfite on brightness (Flot and Hyper) for Example 10 deinking systems.
Figure 29:
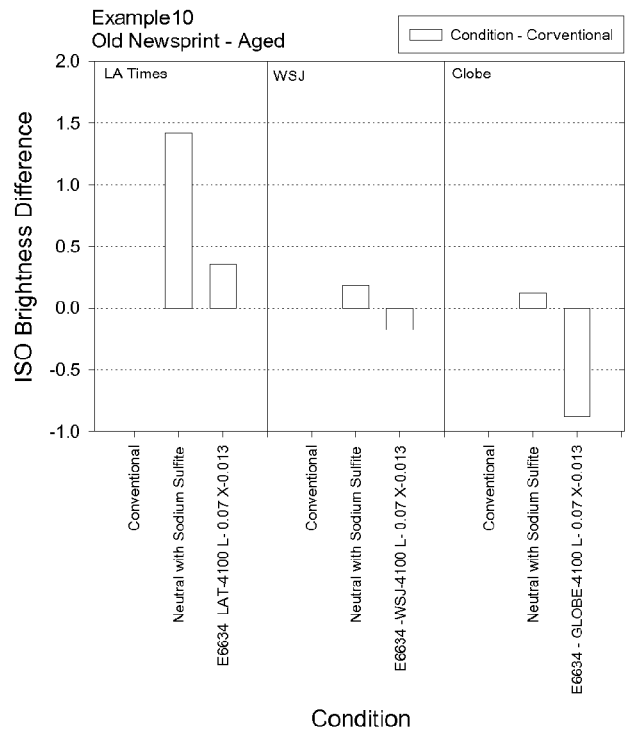
FIG. 29 is a graph showing the effect of paper source, enzymes and sodium sulfite on brightness difference (vs. conventional) for Example 10 deinking systems.

The results of the deinking tests for Example 10 are shown graphically in FIGS. 27-29. Reject levels have been an issue in the development effort. In this study the amount of air injected was dropped from 20 to 15 scfm. Also the cell level was dropped to 4100 g from 4200 g when using the enzymes. This study looks at deinking performance of neutral deinking with no sodium sulfite but with enzymes and is compared to conventional deinking and sulfite based neutral deinking. This comparison in pulper chemistry was made using the Los Angles Times (LAT), the Wall Street Journal (WSJ) and the Globe and Mail (GLOBE). Dropping the air flow rate and a drop to 4100 g cell level for neutral deinking with enzymes without sodium sulfite gave similar reject losses to conventional and a sodium sulfite based pulper chemistry. This study showed the combination of xylanase and lipase at 66/34 at a dose of 0.2% gave equal deinking performance to conventional or sulfite neutral deinking. The worse performance was for the Globe and Mail after flotation and it was within 1 point of conventional.

Example 11

The pulping recipes used in Example 11 (Tests 1 to 23) are listed below in Table 28. A portion of the tests were not related to this study and are not included. The specific pulping components and conditions were: 35 grams each of WSJ, LAT or Globe and Mail, flotation time of 5 min, and air rate of 15 SCHF. The pH operating ranges for Example 11 is listed below in Table 29.

TABLE 28

Pulping recipes for tests 1-23 (Example 11).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 1 | 4200 | Conventional-LAT-4200 | Eka RF 4291 + Eka RF 4031 | | | | NA | 12.0 | 9.8 |
| 13 | 4200 | Neutral w/Sodium Sulfite LAT-4200 | Eka RF 4291 + Eka RF 4031 | Yes | | | NA | 9.6 | 8.3 |
| 14 | 4100 | E6634 LAT-4100 | Eka RF 4291 + Eka RF 4031 | | 0.013 | 0.007 | 66/34 | 9.4 | 8.2 |
| 22 | 4100 | XP 5313 LAT-4100 | Eka RF 4291 + Eka RF 4031 | | 0.013 | 0.007 | 66/34 | 9.4 | 7.8 |
| 3 | 4200 | Conventional-WSJ-4200 | Eka RF 4291 + Eka RF 4031 | | | | NA | 12.2 | 10.0 |
| 4 | 4200 | Neutral w/Sodium Sulfite WSJ-4200 | Eka RF 4291 + Eka RF 4031 | Yes | | | NA | 10.2 | 8.3 |
| 5 | 4100 | E6634 WSJ-4100 | Eka RF 4291 + Eka RF 4031 | | 0.013 | 0.007 | 66/34 | 9.6 | 8.1 |
| 2 | 4100 | Conventional-GLOBE | Eka RF 4291 + Eka RF 4031 | | | | NA | 12.1 | 8.7 |
| 8 | 4000 | Neutral w/Sodium Sulfite GLOBE-4000 | Eka RF 4291 + Eka RF 4031 | Yes | | | NA | 10.2 | 7.7 |
| 7 | 4000 | E6634 GLOBE-4000 | Eka RF 4291 + Eka RF 4031 | | 0.013 | 0.007 | 66/34 | 9.5 | 7.7 |
| 23 | 4000 | XP 5313 GLOBE-4000 | Eka RF 4291 + Eka RF 4031 | | 0.013 | 0.007 | 66/34 | 9.5 | 7.6 |

TABLE 29 pH ranges for Example 10 for neutral deinking

| Neutral Deinking pH range | Pulping Liquor pH | FF pH |
|---|---|---|
| Max pH | 10.2 | 8.3 |
| Min pH | 9.4 | 7.6 |

The deinking performance of the various test recipes were evaluated and the results are shown below in Table 30.

TABLE 30

Deinking Results for tests 1-23 (Example 11).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs Sulfite | Removal Efficiency at Flot |
|---|---|---|---|---|---|---|---|---|---|---|
| 1 | 317 | 924 | 380 | 124 | 44.3 | 51.1 | 53.0 | NA | 2.5 | 58.9 |
| 13 | 373 | 1181 | 429 | 116 | 40.3 | 48.6 | 48.1 | −2.5 | NA | 63.6 |
| 14 | 248 | 1147 | 447 | 180 | 40.5 | 48.1 | 46.6 | −3.0 | −0.5 | 61.1 |
| 22 | 359 | 1011 | 288 | 151 | 40.3 | 49.3 | 45.9 | −1.8 | 0.7 | 71.5 |
| 3 | 450 | 957 | 292 | 156 | 47.5 | 58.8 | 58.2 | NA | 0.9 | 69.5 |
| 4 | 501 | 988 | 267 | 192 | 46.2 | 57.9 | 56.6 | −0.9 | NA | 73.0 |
| 5 | 357 | 1037 | 367 | 176 | 45.5 | 55.0 | 55.2 | −3.8 | −2.9 | 64.6 |
| 2 | 490 | 1055 | 331 | 143 | 44.8 | 54.3 | 55.0 | NA | 0.3 | 68.6 |
| 8 | 662 | 1284 | 301 | 180 | 42.1 | 54.1 | 53.3 | −0.3 | NA | 76.6 |
| 7 | 492 | 1127 | 353 | 140 | 42.6 | 51.6 | 52.0 | −2.7 | −2.5 | 68.7 |
| 23 | 703 | 1174 | 294 | 181 | 42.3 | 51.9 | 51.7 | −2.5 | −2.2 | 74.9 |

For this Example a reject amount over about 380 g (LA Times), 590 (WSJ) or 690 (Globe and Mail) was considered too high a yield loss. In addition to the results in Table 30, the following was observed: test 23 was barely above having too much wet rejects.

Figure 30:
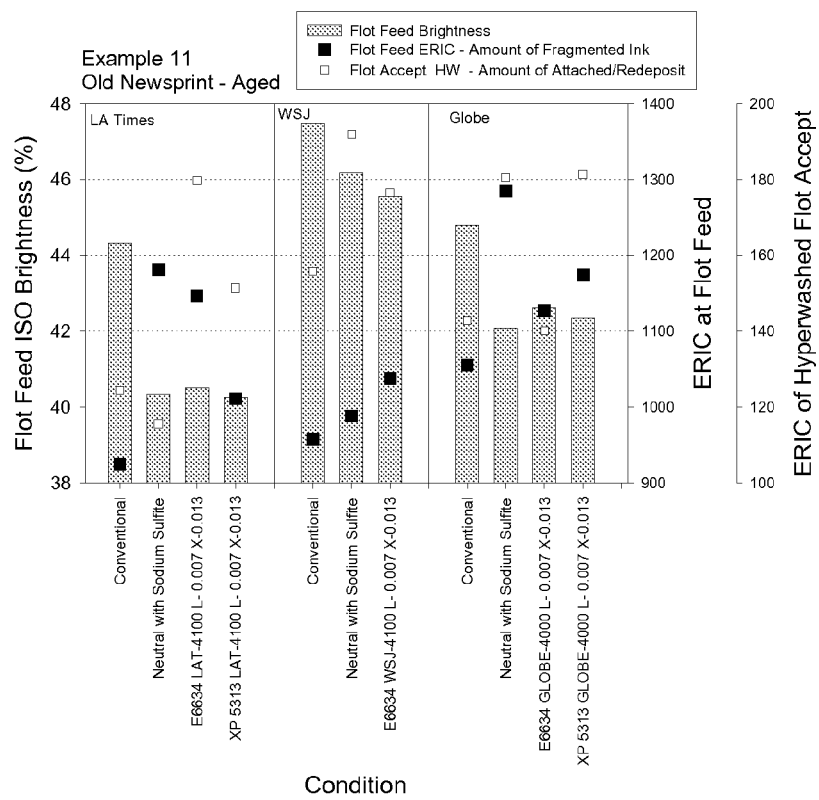
FIG. 30 is a graph showing the effect of paper source, enzymes and sodium sulfite on brightness (pulper) for Example 11 deinking systems.
Figure 31:
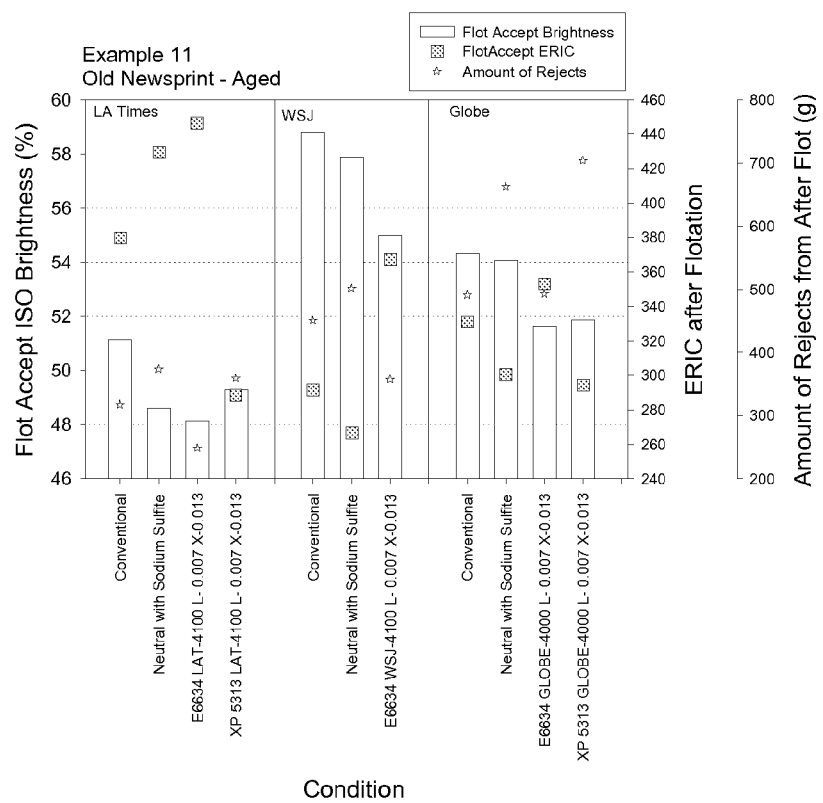
FIG. 31 is a graph showing the effect of paper source, enzymes and sodium sulfite on brightness (Flot and Hyper) for Example 11 deinking systems.
Figure 32:
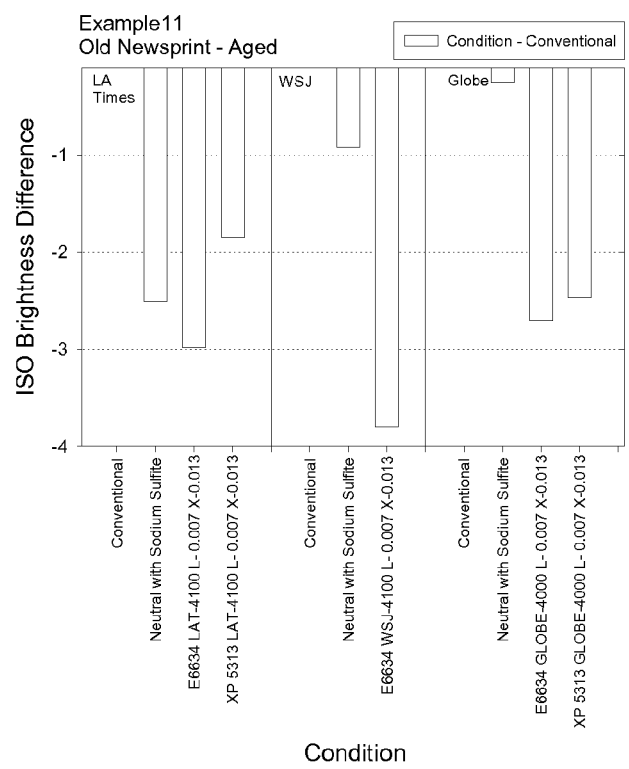
FIG. 32 is a graph showing the effect of paper source, enzymes and sodium sulfite on brightness difference (vs. conventional) for Example 11 deinking systems.

The results of the deinking tests for Example 11 are shown graphically in FIGS. 30-32. The amount of ink redeposited also varied significantly indicating easy to very difficult to deink based on the ERIC hyperwash value as shown in Table 31. In general this example did not meet the within 2 point criteria and was mainly due to the more difficult nature of the ONP based on the aging effect as seen by an increase in the ERIC value of the hyperwashed pulp. This example included blending the mixture of enzymes with a non-ionic surfactant which preformed better than the other neutral deinking pulper recipes for the LA Times and Globe and Mail. The blended mixture condition was not run for the Wall Street Journal.

TABLE 31

Comparison of the amount of attached redeposited ink based on ONP used (Example 11).

| Old Newsprint | Neutral | Conventional Deinking | Conventional Rejects |
|---|---|---|---|
| LAT Average HW | 210 | 201 | very difficult | 180 |
| WSJ Average HW | 177 | 107 | easy | 388 |

TABLE 31-continued

Comparison of the amount of attached redeposited ink based on ONP used (Example 11).

| Old Newsprint | Neutral | Conventional Deinking | Conventional Rejects |
|---|---|---|---|
| GLOBE Average HW | 165 | 141 difficult | 491 |

Example 12

The pulping recipes used in Example 12 are listed below in Table 32. A portion of the tests were not related to this study and are not included or were repeats averaged into the reported results. The specific pulping components and conditions were: 17.5 grams each of WSJ and LAT, flotation time of 5 min, and air rate of 15 SCHF. The pH operating ranges for Example 12 is listed below in Table 33.

TABLE 32

Pulping recipes (Example 12).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| | 4200 | Conventional | Eka RF 4291 + Eka RF 4031 | | | | NA | 11.3 | 9.6 |
| | 4200 | Conventional | Eka NA120 + Eka RF 4031 | | | | NA | 11.4 | 9.6 |
| 5 | 4200 | Neutral w/ NaSul - RF 4291 | Eka RF 4291 + Eka RF 4031 | Yes | | | NA | 9.8 | 8.5 |
| 8 | 4200 | Neutral w/NaSul- 120 NA | Eka NA120 + Eka RF 4031 | Yes | | | NA | 9.8 | 8.6 |
| 9 | 4100 | Neutral/No NaSul - RF 4291 | Eka RF 4291 + Eka RF 4031 | | | | NA | 9.6 | 8.5 |
| 10 | 4100 | Neutral/No NaSul - 120 NA | Eka NA120 + Eka RF 4031 | | | | NA | 9.6 | 8.6 |
| | 4100 | E6634 - RF 4291 | Eka RF 4291 + Eka RF 4031 | | 0.013 | 0.07 | 66/34 | 9.6 | 8.5 |
| | 4100 | E6634 - NA 120 | Eka NA120 + Eka RF 4031 | | 0.013 | 0.07 | 66/34 | 9.6 | 8.6 |

TABLE 33 pH ranges for Example 12 for neutral deinking

| Neutral Deinking pH range | Pulping Liquor pH | FF pH |
|---|---|---|
| Max pH | 9.8 | 8.6 |
| Min pH | 9.6 | 8.5 |

For this Example a reject amount over about 1030 g (Eka RF 4291) or 920 (Eka NA120) was considered too high a yield loss. In addition to the results in Table 34, the following was observed: none of the tests had too much wet rejects.

Figure 33:
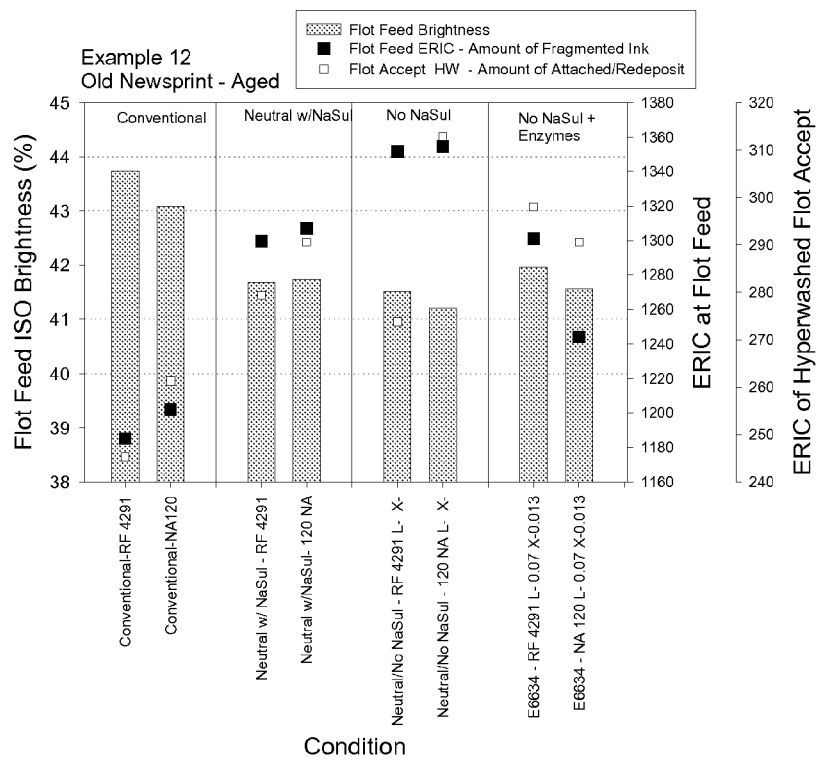
FIG. 33 is a graph showing the effect of enzymes and sodium sulfite on brightness (pulper) for Example 12 deinking systems.
Figure 34:
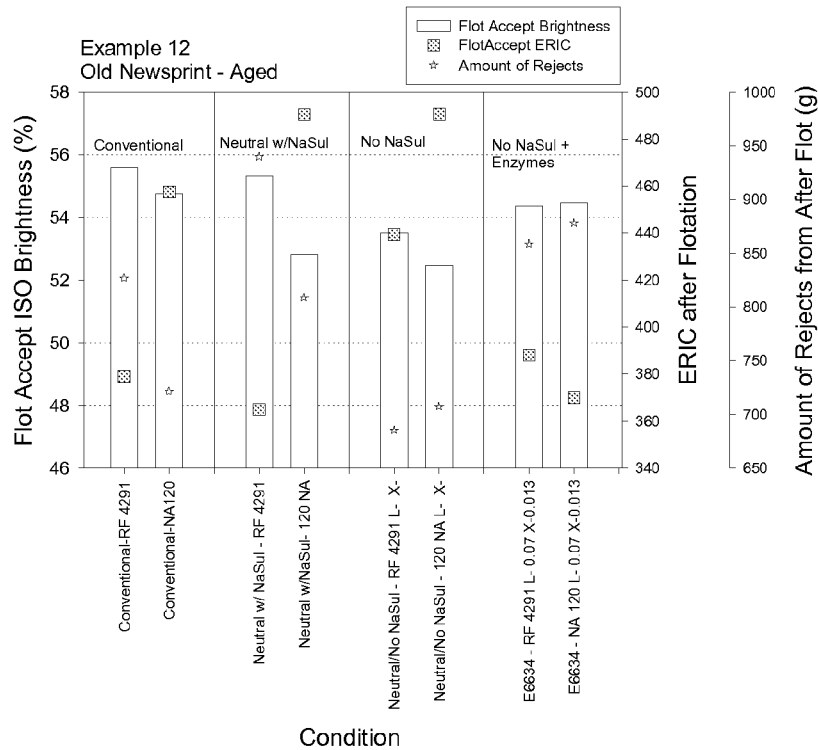
FIG. 34 is a graph showing the effect of enzymes and sodium sulfite on brightness (Flot and Hyper) for Example 12 deinking systems.
Figure 35:
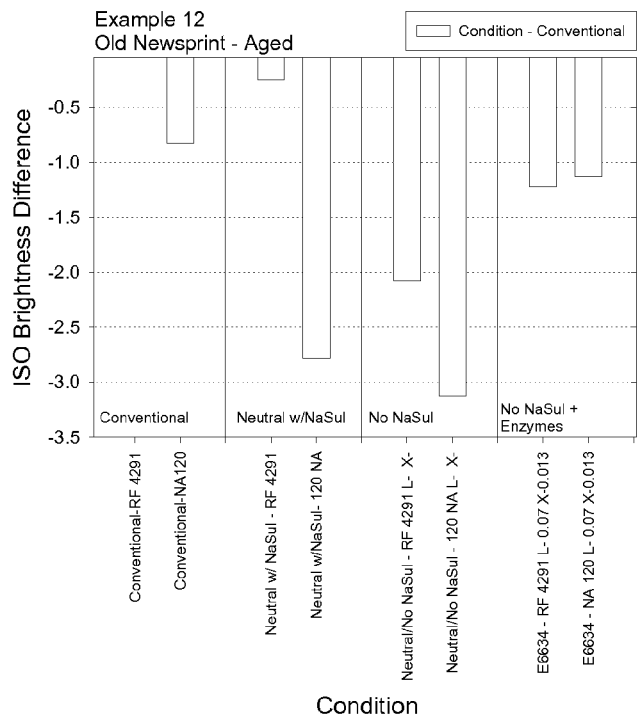
FIG. 35 is a graph showing the effect of enzymes and sodium sulfite on brightness difference (vs. conventional) for Example 12 deinking systems.

The results of the deinking tests for Example 12 are shown graphically in FIGS. 33-35. The paper used in this study was very difficult to deink as denoted by having a hyperwash ERIC value of about 250 for conventional deinking due to the age of the paper. The study showed under these challenging conditions that the addition of the enzyme mixture of 66% xylanase and 33% lipase without sodium sulfite gave comparable deinking performance to conventional and to sodium sulfite based neutral deinking. The study also showed that a deinking agent beside Eka RF 4291 could be used for neutral deinking. The study also showed that in general Eka RF 4291 was a better deinking agent than the current formula used to make Eka NA 120.

TABLE 34

Deinking Results (Example 12).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs Sulfite | Removal Efficiency at Flot |
|---|---|---|---|---|---|---|---|---|---|---|
| | 826 | 1185 | 379 | 245 | 43.7 | 55.6 | 56.7 | NA | 0.2 | 68 |
| | 721 | 1202 | 458 | 261 | 43.1 | 54.8 | 55.9 | NA | 2.0 | 62 |
| 5 | 939 | 1299 | 365 | 279 | 41.7 | 55.3 | 54.9 | -0.2 | NA | 71.9 |
| 8 | 808 | 1307 | 491 | 291 | 41.8 | 52.8 | 54.5 | -2.0 | NA | 62.5 |
| 9 | 685 | 1352 | 439 | 274 | 41.5 | 53.5 | 54.6 | -2.1 | -1.8 | 67.5 |

TABLE 34-continued

Deinking Results (Example 12).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs Sulfite | Removal Efficiency at Flot |
|---|---|---|---|---|---|---|---|---|---|---|
| 10 | 707 | 1355 | 491 | 313 | 41.2 | 52.5 | 53.9 | −2.3 | −0.3 | 63.8 |
|  | 858 | 1301 | 388 | 298 | 42.0 | 54.4 | 53.7 | −1.2 | −1.0 | 70 |
|  | 878 | 1244 | 370 | 291 | 41.6 | 54.5 | 53.6 | −0.3 | 1.7 | 70 |

Example 13

The pulping recipes used in Example 13 (Tests 1-14) are listed below in Table 35. The specific pulping components and conditions were: 17.5 grams each of WSJ and LAT, flotation time of 5 min, and air rate of 15 SCHF. The pH operating ranges for Example 13 is listed below in Table 36.

TABLE 35

Pulping recipes for tests 1-14 (Example 13).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 1 | 4200 | Conventional-NaOH 1% | Eka RF 4291 + Eka RF 4031 |  |  |  | NA | 11.5 | 9.5 |
| 3 | 4200 | Conventional-NaOH 0.6% | Eka RF 4291 + Eka RF 4031 |  |  |  | NA | 11.1 | 9.2 |
| 4 | 4200 | Conventional-NaOH 0.3% | Eka RF 4291 + Eka RF 4031 |  |  |  | NA | 10.6 | 8.9 |
| 5 | 4200 | Conventional-NaOH 0.15% | Eka RF 4291 + Eka RF 4031 |  |  |  | NA | 10.2 | 8.6 |
| 6 | 4200 | Conventional-NaOH 0.03% | Eka RF 4291 + Eka RF 4031 |  |  |  | NA | 9.5 | 8.5 |
| 2 | 4200 | Neutral w/NaSulfite | Eka RF 4291 + Eka RF 4031 | Yes |  |  | NA | 9.5 | 8.6 |
| 8 | 4100 | Neutral wo/NaSulfite | Eka RF 4291 + Eka RF 4031 |  |  |  | NA | 9.5 | 8.5 |
| 7 | 4100 | E6634 | Eka RF 4291 + Eka RF 4031 |  | 0.013 | 0.007 | 66/34 | 9.5 | 8.4 |
| 9 | 4100 | E6634-NaOH 0.03% | Eka RF 4291 + Eka RF 4031 |  | 0.013 | 0.007 | 66/34 | 9.6 | 8.4 |
| 10 | 4100 | E6634-NaOH 0.08% | Eka RF 4291 + Eka RF 4031 |  | 0.013 | 0.007 | 66/34 | 9.9 | 8.7 |
| 11 | 4100 | E6634-NaOH 0.15% | Eka RF 4291 + Eka RF 4031 |  | 0.013 | 0.007 | 66/34 | 10.4 | 8.8 |
| 12 | 4100 | E6634-NaOH 0.3% | Eka RF 4291 + Eka RF 4031 |  | 0.013 | 0.007 | 66/34 | 11.0 | 9.1 |
| 13 | 4100 | E6634-NaOH 0.6% | Eka RF 4291 + Eka RF 4031 |  | 0.013 | 0.007 | 66/34 | 11.3 | 9.4 |
| 14 | 4100 | E6634-NaOH 1% | Eka RF 4291 + Eka RF 4031 |  | 0.013 | 0.007 | 66/34 | 11.5 | 10.1 |

TABLE 36 pH ranges for Example 13 for neutral deinking

| Neutral Deinking pH range | Pulping Liquor pH | FF pH |
|---|---|---|
| Max pH | 10.4 | 8.8 |
| Min pH | 9.5 | 8.4 |

For this Example a reject amount over about 1020 to 1070 g was considered too high a yield loss. In addition to the results in Table 37, the following was observed: none of the tests had too much wet rejects.

Figure 36:
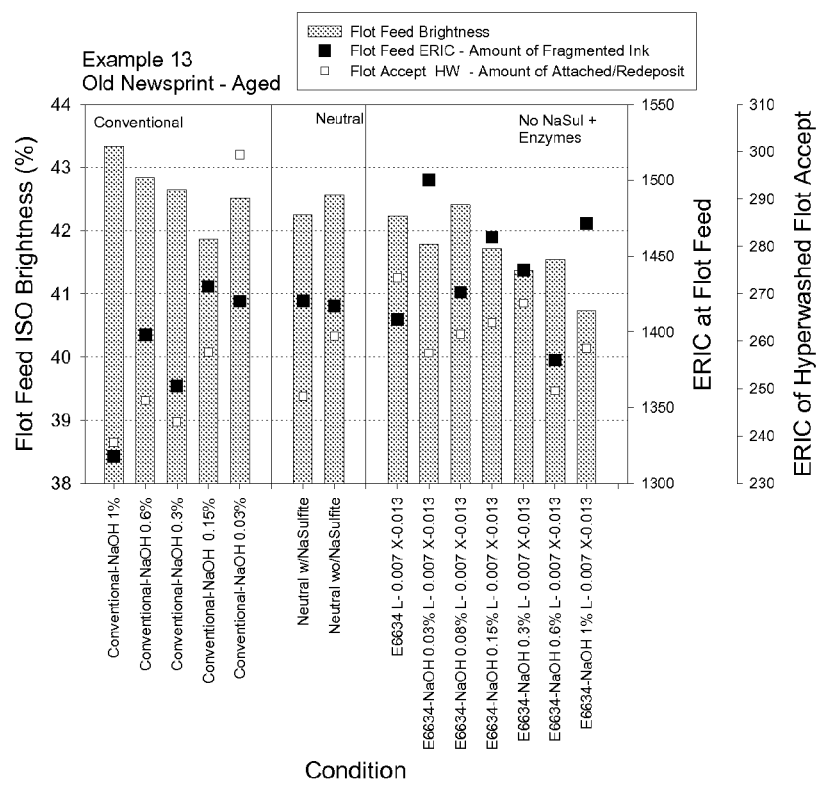
FIG. 36 is a graph showing the effect of enzymes, sodium hydroxide and sodium sulfite on brightness (pulper) for Example 13 deinking systems.
Figure 37:
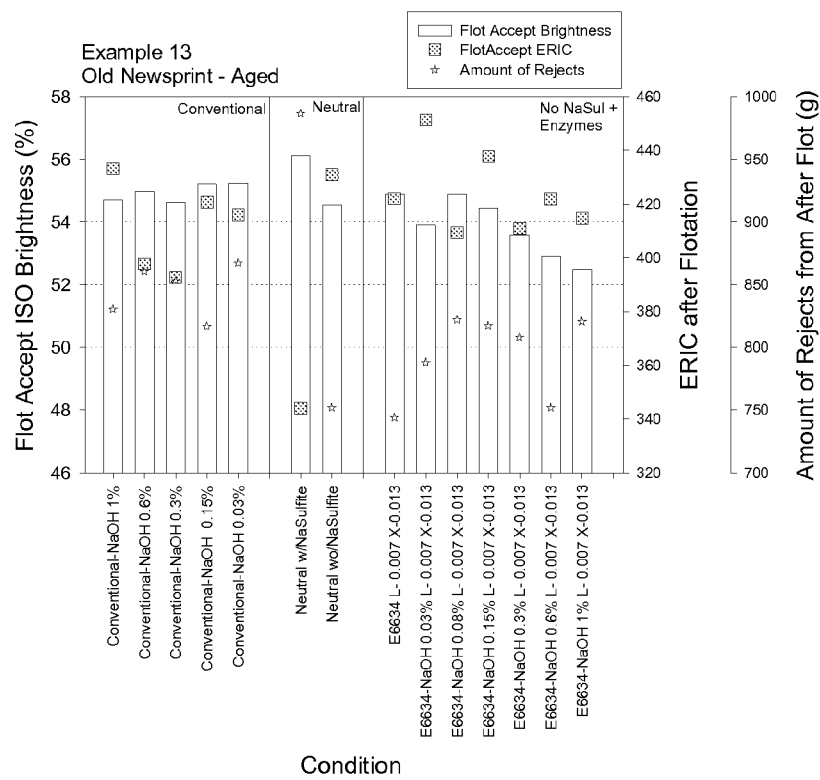
FIG. 37 is a graph showing the effect of enzymes, sodium hydroxide and sodium sulfite on brightness (Flot and Hyper) for Example 13 deinking systems.
Figure 38:
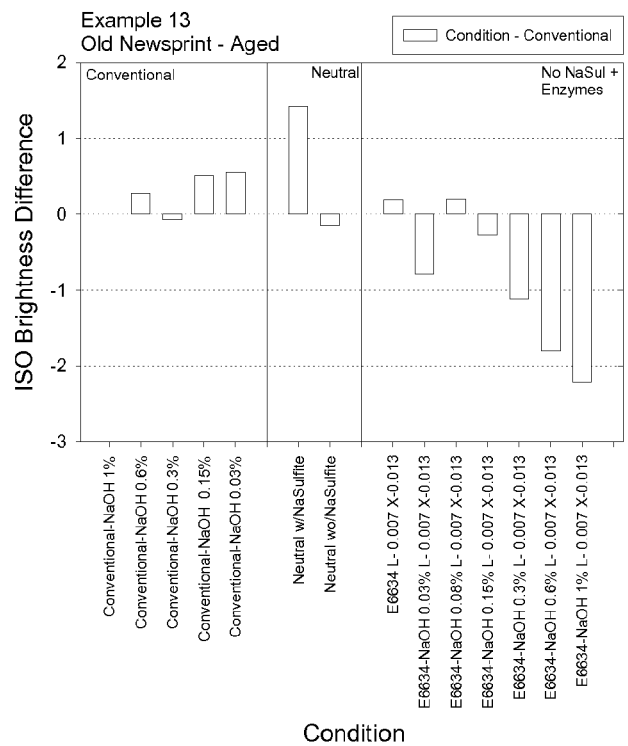
FIG. 38 is a graph showing the effect of enzymes, sodium hydroxide and sodium sulfite on brightness difference (vs. conventional) for Example 13 deinking systems.

The results of the deinking tests for Example 13 are shown graphically in FIGS. 36-38. The paper used in this study was very difficult to deink as denoted by having a hyperwash ERIC value of about 240 for conventional deinking due to the age of the paper. The study showed under these challenging conditions that the addition of the enzyme mixture of 66% xylanase and 33% lipase without sodium sulphite gave comparable deinking performance to conventional and to sodium sulphite based neutral deinking. The study also showed that above 0.15% of caustic addition the loss of enzyme performance in conjunction with yellowing of fiber give a brightness a point lower than conventional and going above 0.3% lowered brightness by 2 points. With regards to pH, a value above 10 in the pulping liquor would be beyond the range of enzyme performance or a pH of 9 after pulping.

TABLE 37

Deinking Results for tests 1-14 (Example 13).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs Sulfite | Removal Efficiency at Flot |
|---|---|---|---|---|---|---|---|---|---|---|
| 1 | 830 | 1318 | 433 | 239 | 43.3 | 54.7 | 55.9 | NA | −1.4 | 67.1 |
| 3 | 860 | 1398 | 398 | 247 | 42.8 | 55.0 | 55.0 | 0.3 | −1.1 | 71.6 |
| 4 | 853 | 1364 | 393 | 243 | 42.7 | 54.6 | 54.6 | −0.1 | −1.5 | 71.2 |
| 5 | 817 | 1430 | 421 | 258 | 41.9 | 55.2 | 54.9 | 0.5 | −0.9 | 70.6 |
| 6 | 867 | 1420 | 416 | 299 | 42.5 | 55.3 | 54.9 | 0.5 | −0.9 | 70.7 |
| 2 | 986 | 1420 | 344 | 248 | 42.3 | 56.1 | 54.7 | 1.4 | NA | 75.8 |
| 8 | 752 | 1417 | 431 | 261 | 42.6 | 54.6 | 53.7 | −0.2 | −1.6 | 69.6 |
| 7 | 744 | 1408 | 422 | 273 | 42.2 | 54.9 | 54.5 | 0.2 | −1.2 | 70.0 |
| 9 | 788 | 1500 | 451 | 258 | 41.8 | 53.9 | 54.2 | −0.8 | −2.2 | 69.9 |
| 10 | 822 | 1426 | 409 | 262 | 42.4 | 54.9 | 54.4 | 0.2 | −1.2 | 71.3 |
| 11 | 817 | 1463 | 438 | 264 | 41.7 | 54.4 | 53.6 | −0.3 | −1.7 | 70.1 |
| 12 | 808 | 1441 | 411 | 268 | 41.4 | 53.6 | 53.9 | −1.1 | −2.5 | 71.5 |
| 13 | 751 | 1381 | 422 | 250 | 41.5 | 52.9 | 53.2 | −1.8 | −3.2 | 69.4 |
| 14 | 820 | 1472 | 415 | 259 | 40.7 | 52.5 | 52.1 | −2.2 | −3.6 | 71.8 |

Example 14

The pulping recipes used in Example 14 (Tests 1-14) are listed below in Table 38. The specific pulping components and conditions were: 17.5 grams each of WSJ and LAT, flotation time of 5 min, and air rate of 15 SCHF. The pH operating ranges for Example 14 is listed below in Table 39. This study used a pulping consistency of 20%.

TABLE 38

Pulping recipes for tests 1-6 (Example 14).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 1 | 4200 | Conventional | Eka RF 4291 + Eka RF 4031 | | | | NA | 11.45 | 9.16 |
| 2 | 4200 | Neutral w/ NaSul - RF 4291 | Eka RF 4291 + Eka RF 4031 | Yes | | | NA | 9.71 | 8.23 |
| 4 | 4100 | XP 5313 0.045% | XP 5313 at 0.045% | | 0.0075 | 0.00375 | 66/34 | 9.68 | 8.32 |
| 6 | 4100 | XP 5313 0.065% | XP 5313 at 0.065% | | 0.011 | 0.0055 | 66/34 | 9.78 | 8.38 |
| 3 | 4100 | XP 5313 Tote 0.045% | XP 5313-Tote at 0.045% | | 0.0075 | 0.00375 | 66/34 | 9.59 | 8.06 |
| 5 | 4100 | XP 5313 Tote 0.065% | XP 5313-Tote at 0.065% | | 0.011 | 0.0055 | 66/34 | 9.755 | 8.385 |

TABLE 39 pH ranges for Example 14 for neutral deinking

| Neutral Deinking pH range | Pulping Liquor pH | FF pH |
|---|---|---|
| Max pH | 9.8 | 8.4 |
| Min pH | 9.6 | 8.1 |

For this Example a reject amount over about 790 g was considered too high a yield loss. In addition to the results in Table 40, the following was observed: none of the tests had too much wet rejects.

Figure 39:
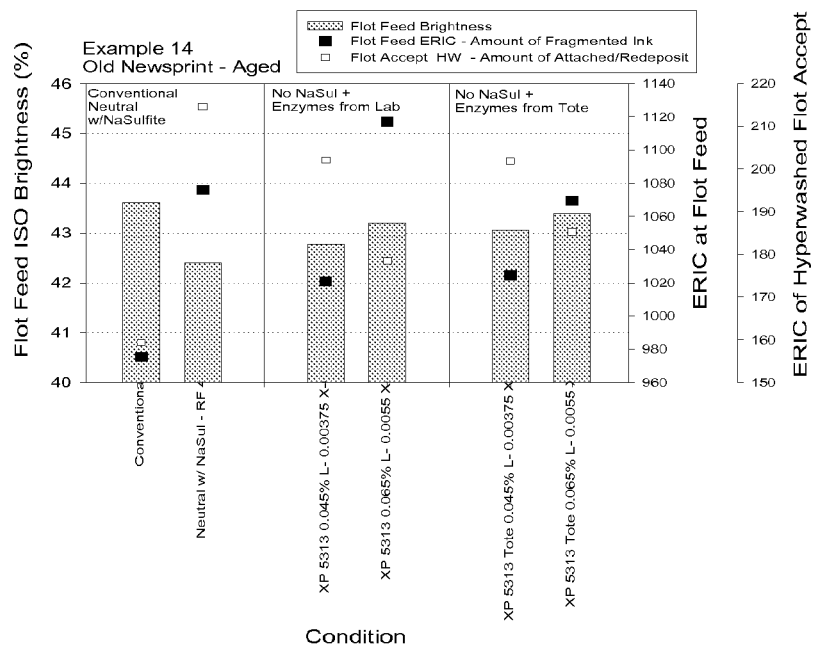
FIG. 39 is a graph showing the effect of enzymes and sodium sulfite on brightness (pulper) for Example 14 deinking systems.
Figure 40:
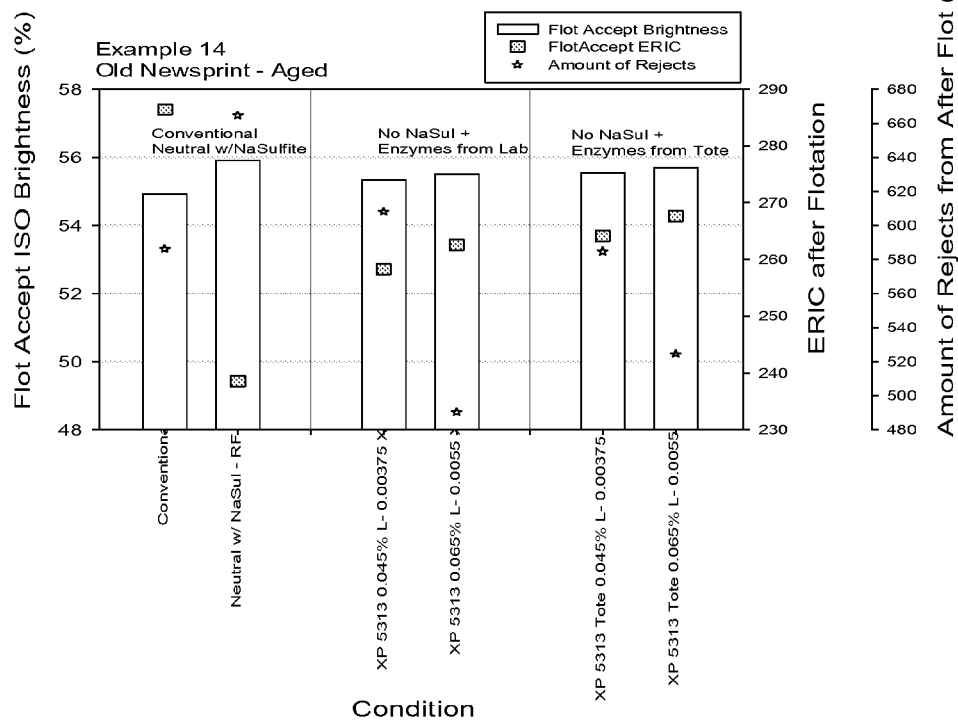
FIG. 40 is a graph showing the effect of enzymes and sodium sulfite on brightness (Flot and Hyper) for Example 14 deinking systems.
Figure 41:
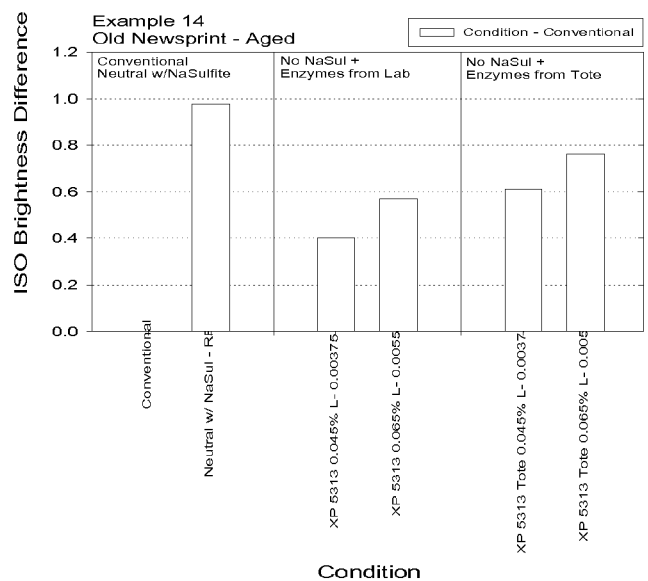
FIG. 41 is a graph showing the effect of enzymes and sodium sulfite on brightness difference (vs. conventional) for Example 14 deinking systems.
Figure 42:
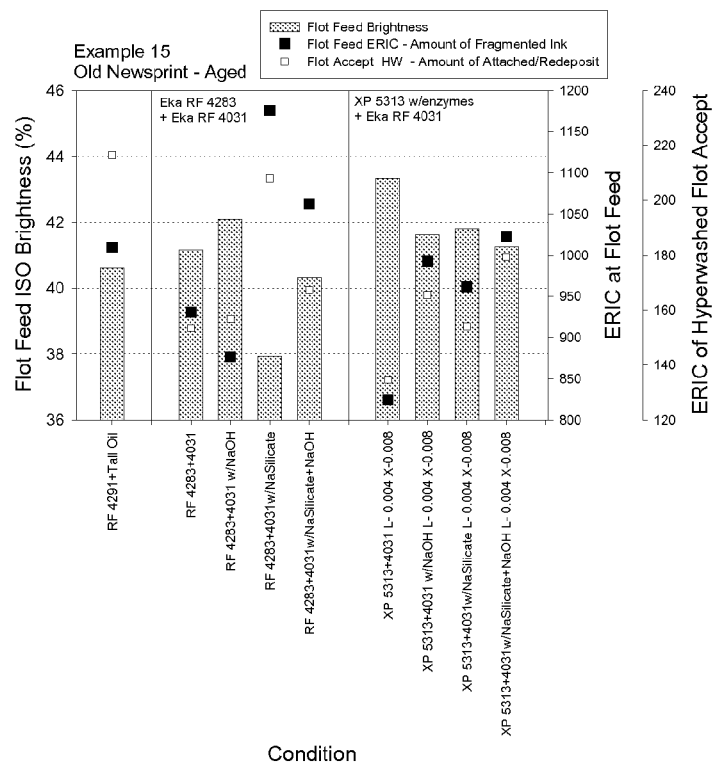
FIG. 42 is a graph showing the effect of enzymes, sodium hydroxide and sodium sulfite on brightness (pulper) for Example 15 deinking systems.
Figure 43:
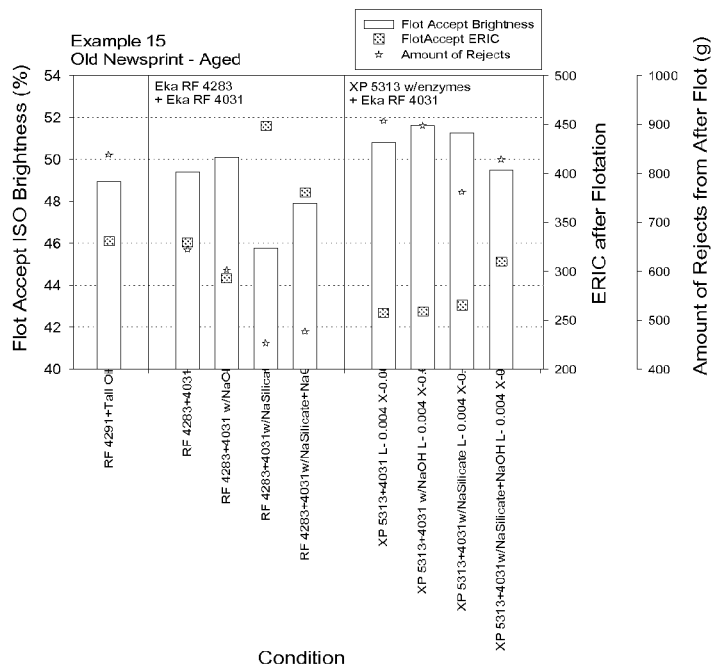
FIG. 43 is a graph showing the effect of enzymes, sodium hydroxide and sodium sulfite on brightness (Flot and Hyper) for Example 15 deinking systems.
Figure 44:
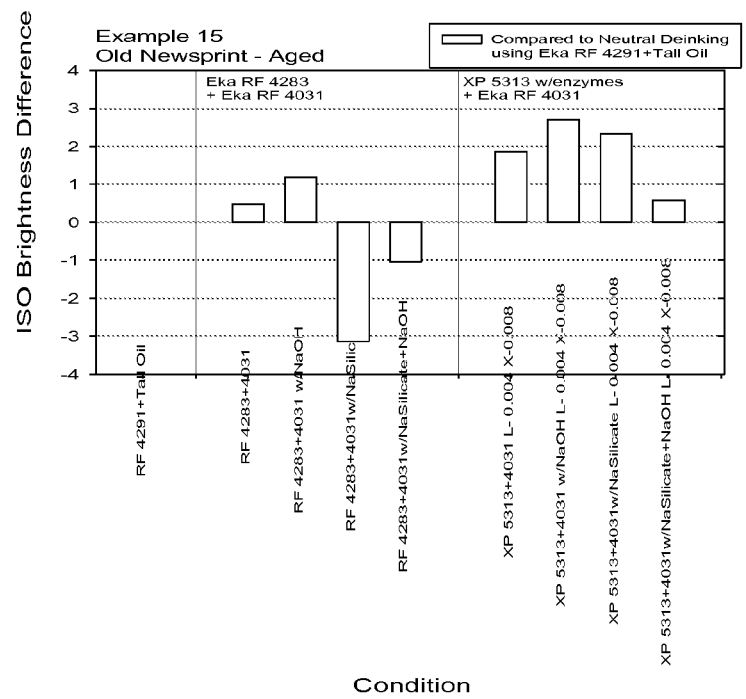
FIG. 44 is a graph showing the effect of enzymes, sodium hydroxide and sodium sulfite on brightness difference (vs. conventional) for Example 15 deinking systems.

The results of the deinking tests for Example 14 are shown graphically in FIGS. 39-41. The blend of xylanase and lipase with the non-ionic surfactant using either production grade product in a tote or from lab samples had a lower amount of residual ink and about 0.5 points brighter after flotation. The amount of attached/redeposited ink after hyperwashing was 150 for conventional and 196 with neutral deinking indicating difficult to deink old newsprint. The reject levels for neutral are equal to slightly lower indicating that increased solids loss was not the cause of better deinking performance.

TABLE 40

Deinking Results for tests 1-6 (Example 14).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs Sulfite | Removal Efficiency at Flot |
|---|---|---|---|---|---|---|---|---|---|---|
| 1 | 586 | 975 | 286 | 159 | 43.6 | 54.9 | 56.1 | NA | −1.0 | 70.6 |
| 2 | 664 | 1076 | 239 | 215 | 42.4 | 55.9 | 53.3 | 1.0 | NA | 77.8 |

TABLE 40-continued

Deinking Results for tests 1-6 (Example 14).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs Sulfite | Removal Efficiency at Flot |
|---|---|---|---|---|---|---|---|---|---|---|
| 4 | 608 | 1021 | 258 | 202 | 42.8 | 55.3 | 54.3 | 0.4 | −0.6 | 74.7 |
| 6 | 490 | 1117 | 263 | 178 | 43.2 | 55.5 | 55.3 | 0.6 | −0.4 | 76.5 |
| 3 | 585 | 1025 | 264 | 202 | 43.1 | 55.5 | 54.7 | 0.6 | −0.4 | 74.2 |
| 5 | 524 | 1070 | 268 | 185 | 43.4 | 55.7 | 54.1 | 0.8 | −0.2 | 74.9 |

Example 15

The pulping recipes used in Example 15 (Tests 1-14) are listed below in Table 41. The specific pulping components and conditions were: 50.0 grams mixture of old newspaper using flexographic ink and coated paper, flotation time of 5 min, and air rate of 15 SCHF. The pH operating ranges for Example 15 is listed below in Table 42. This study used a pulping consistency of 20%.

TABLE 41

Pulping recipes for tests 1-6 (Example 15).

| Test # | Cell Level, grams | Pulper | Deinking Agents | Sulfite | Xylanase % | Lipase % | Ratio | Pulp Liquor pH | FF pH |
|---|---|---|---|---|---|---|---|---|---|
| 1 | 4200 | RF 4291 + Tall Oil | Eka RF 4291 | | | | NA | 7.6 | 7.2 |
| 2 | 4200 | RF 4283 + 4031 | Eka RF 4283 | | | | NA | 7.9 | 7.3 |
| 5 | 4200 | RF 4283 + 4031 w/NaOH | Eka RF 4283 + Eka RF 4031 | | | | NA | 9.9 | 7.4 |
| 4 | 4200 | RF 4283 + 4031 w/NaSilicate | Eka RF 4283 + Eka RF 4031 | | | | NA | 8.9 | 7.2 |
| 8 | 4200 | RF 4283 + 4031 w/NaSilicate + NaOH | Eka RF 4283 + Eka RF 4031 | | | | NA | 9.9 | 7.5 |
| 3 | 4200 | XP 5313 + 4031 | XP 5313 + Eka RF 4031 | | 0.008 | 0.004 | 66/34 | 8.0 | 7.2 |
| 6 | 4200 | XP 5313 + 4031 w/NaOH | XP 5313 + Eka RF 4031 | | 0.008 | 0.004 | 66/34 | 10.0 | 7.4 |
| 7 | 4200 | XP 5313 + 4031 w/NaSilicate | XP 5313 + Eka RF 4031 | | 0.008 | 0.004 | 66/34 | 9.0 | 7.4 |
| 9 | 4200 | XP 5313 + 4031 w/NaSilicate + NaOH | XP 5313 + Eka RF 4031 | | 0.008 | 0.004 | 66/34 | 10.1 | 7.5 |

TABLE 42 pH ranges for Example 15 for neutral deinking

| Neutral Deinking pH range | Pulping Liquor pH | FF pH |
|---|---|---|
| Max pH | 9.0 | 7.4 |
| Min pH | 7.6 | 7.2 |

TABLE 43

Deinking Results for tests 1-6 (Example 15).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs Sulfite | Removal Efficiency at Flot |
|---|---|---|---|---|---|---|---|---|---|---|
| 1 | 838 | 1010 | 331 | 217 | 40.6 | 48.9 | 48.8 | NA | NA | 67.3 |
| 2 | 644 | 931 | 330 | 154 | 41.2 | 49.4 | 51.3 | 0.5 | NA | 64.6 |
| 5 | 602 | 877 | 293 | 157 | 42.1 | 50.1 | 50.5 | 1.2 | NA | 66.6 |
| 4 | 453 | 1176 | 448 | 208 | 37.9 | 45.8 | 47.3 | −3.1 | NA | 61.9 |

TABLE 43-continued

Deinking Results for tests 1-6 (Example 15).

| Test # | Wet Reject Wt. | ERIC Pulper | ERIC Flot | ERIC Hyper | Brightness Pulper | Brightness Flot | Brightness Hyper | Brightness Difference vs. Conv | Brightness Difference vs Sulfite | Removal Efficiency at Flot |
|---|---|---|---|---|---|---|---|---|---|---|
| 8 | 477 | 1062 | 381 | 167 | 40.3 | 47.9 | 49.1 | −1.0 | NA | 64.2 |
| 3 | 907 | 825 | 258 | 135 | 43.3 | 50.8 | 52.1 | 1.9 | NA | 68.7 |
| 6 | 898 | 993 | 259 | 166 | 41.6 | 51.6 | 51.0 | 2.7 | NA | 73.9 |
| 7 | 762 | 962 | 265 | 154 | 41.8 | 51.3 | 49.9 | 2.3 | NA | 72.4 |
| 9 | 828 | 1023 | 310 | 179 | 41.3 | 49.5 | 49.3 | 0.6 | NA | 69.7 |

The ink fragmentation test conditions were within the range of conventional deinking except for the neutral deinking tests that included hydrogen peroxide. For ERIC values after flotation all of the neutral deinking conditions matched or out preformed conventional deinking. Except for cellulase all of the other neutral deinking conditions gave equal to better ink detachment.

All of the neutral deinking conditions were within 2 points of conventional deinking after flotation. Tests that included Xylanase, Xylanase/Lipase and peroxide had higher brightness than the sulfite based neutral deinking.

The hyperwash brightness after flotation was within two points of conventional deinking expect for tests that included sodium sulfite and lipase alone, cellulase alone, or amylase alone.

The tests that included lipase and hydrogen peroxide tended to have the highest levels of rejected material. However, the hydrogen peroxide tests were not been conducted at lower air injection rates.

What is claimed is:

1. A method for removing ink from printed paper comprising the steps of:
   (a) pulping printed paper at least 25 wt % of which is old newsprint at a consistency of at least about 3% to obtain a pulp slurry;
   (b) treating the pulp slurry with an ink removing system, which system comprises:
      (i) an enzyme combination consisting of lipase and xylanase, and
      (ii) a non-ionic surfactant, in amounts effective to release ink from said pulp slurry,
      wherein the lipase is present in an amount of at least about 0.001 wt % based on the dry content of the pulp slurry and the ratio of xylanase: lipase is at least about 1.2:1, wherein the total amount of enzyme is in the range from 0.0022 to less than 0.025 wt % based on the dry content of the pulp slurry; and
   (c) separating the released ink from the pulp slurry in a deinking flotation stage to provide a deinked pulp slurry, wherein the treating step is carried out prior to the deinking flotation stage, and wherein the ink removal efficiency is at least about 50%.

2. A method according to claim 1, wherein the ratio of xylanase: lipase is at least about 1.5:1.

3. A method according to claim 2, wherein the ratio of xylanase: lipase is in the range of about 1.5:1 to about 2.5:1.

4. A method according to claim 2, wherein the non-ionic surfactant is chosen from fatty alcohol ethyoxylates (FAEO), propoxylates (FAPO) and combination thereof (FAEPO).

5. A method according to claim 4, wherein the ratio of (i): ii) is in the range of about 1:2 to about 1:4.

6. A method according to claim 1, wherein the ink removing system further comprises (iii) a soap.

7. A method according to claim 6, wherein the ink removing system further comprises (iv) an alkaline reagent.

8. A method according to claim 7, wherein the printed paper comprises ONP in an amount in the range of from about 40 wt % to about 95 wt %.

9. A method according to claim 7, wherein the soap is a fatty acid soap.

10. A method according to claim 7, wherein the alkaline reagent is sodium silicate.

11. A method according to claim 7, wherein the combination of enzymes (i) is a combination of lipase and xylanase; the non-ionic surfactant (ii) is chosen from fatty alcohol ethoxylates (FAEO), propoxylates (FAPO) and combinations thereof (FAEPO): the soap (iii) is a tallow fatty acid soap; and the alkaline reagent (iv) is sodium silicate.

12. A method according to claim 11, wherein the ratio of (i): (ii) is in the range of about 1:2 to 1:4.

13. A method according to claim 12, wherein (i) and (ii) are premixed to form an enzyme composition (v) and then adding (v) to the pulp slurry as a component of the ink removing system.

14. A method according to claim 13, wherein the enzyme composition (v) is added to the pulp slurry in an amount in the range of about 0.04 to about 0.5 wt %, the soap (iii) is added to the pulp slurry in an amount in the range of about 0.1 to about 1 wt %, and the alkaline reagent (iv) is added to the pulp slurry in an amount in the range of about 0.5 to about 2 wt %, all based on the solid content of the slurry.

15. A method according to claim 13, wherein the pH of the slurry is maintained in the range of about 6 to about 11.

16. A method according to claim 13, wherein the slurry is substantially free of sodium sulfite.

17. A method according to claim 13, wherein the slurry is substantially free of sodium hydroxide or, if added to the slurry, the sodium hydroxide is added in an amount less than 0.15 wt %, based on the weight of the slurry.

18. A method according to claim 13, wherein the slurry is substantially free of hydrogen peroxide.

19. A method according to claim 13, wherein the ink removal efficiency is at least 70%.

20. A method for removing ink from printed paper comprising the steps of:
   (a) pulping printed paper at least 25 wt % of which is old newsprint at a consistency of at least about 3% to obtain a pulp slurry;
   (b) treating the pulp slurry with an ink removing system, which system comprises:
      (i) an enzyme combination consisting of lipase and xylanase, wherein the lipase is present in an amount of at least about 0.001 wt % based on the dry content of the pulp slurry, the ratio of xylanase to lipase is at least about 1.2:1, and the total amount of enzyme is in the range from 0.0022 to less than 0.025wt % based on the dry content of the pulp slurry; and (ii) a nonionic surfactant, in amounts effective to release ink from said pulp slurry, and (c) separating the released ink from the pulp slurry in a deinking flotation stage to provide a deinked pulp slurry, wherein the treating step is carried out prior to the deinking flotation stage, and wherein the ink removal efficiency is at least about 50%; and wherein the pH of the deinking flotation stage is between 7.3 and 7.6.

* * * * *